(12) United States Patent
Kang et al.

(10) Patent No.: US 12,059,762 B2
(45) Date of Patent: Aug. 13, 2024

(54) PIPING SPOOL AUTO MANUFACTURING SYSTEM

(71) Applicants: HDHYUNDAI ROBOTICS CO., LTD., Daegu (KR); SAMSUNG E&A CO., LTD., Seoul (KR)

(72) Inventors: Sung-Gi Kang, Yongin-si (KR); Young-Choon Kwak, Namyangju-si (KR); Sun-Gyu Hwang, Seoul (KR); Sung-Keun Kim, Seoul (KR); Roh-Hyun Myung, Seoul (KR); Sang-Hun Rim, Hanam-si (KR); Byeong-Yeol Lee, Seoul (KR); Sang-Pil Cheon, Yongin-si (KR); Chan-Won Seo, Seongnam-si (KR); Jung-Hoon Choo, Yongin-si (KR); Min-Kue Choi, Incheon (KR)

(73) Assignees: HDHYUNDAI ROBOTICS CO., LTD, Daegu (KR); SAMSUNG E&A CO., LTD, Seoul (KR)

( * ) Notice: Subject to any disclaimer, the term of this patent is extended or adjusted under 35 U.S.C. 154(b) by 0 days.

(21) Appl. No.: 18/546,098

(22) PCT Filed: Nov. 23, 2021

(86) PCT No.: PCT/KR2021/017303
§ 371 (c)(1),
(2) Date: Aug. 11, 2023

(87) PCT Pub. No.: WO2023/277277
PCT Pub. Date: Jan. 5, 2023

(65) Prior Publication Data
US 2023/0405743 A1    Dec. 21, 2023

(30) Foreign Application Priority Data

Jul. 1, 2021  (KR) .................. 10-2021-0086472
Oct. 19, 2021 (KR) .................. 10-2021-0139302

(51) Int. Cl.
*B23P 21/00*     (2006.01)
*B23D 21/00*     (2006.01)
(Continued)

(52) U.S. Cl.
CPC ............ *B23P 21/004* (2013.01); *B23D 21/00* (2013.01); *B23K 37/0276* (2013.01);
(Continued)

(58) Field of Classification Search
CPC ............ B23P 21/004; Y10T 29/49829; Y10T 29/534; Y10T 29/53417;
(Continued)

(56) References Cited

U.S. PATENT DOCUMENTS 5,444,206 A      8/1995  Isshiki et al.
2013/0136540 A1*  5/2013  Jones .................. B23K 13/015
                                                219/61

(Continued)

FOREIGN PATENT DOCUMENTS

CN    107838685 A    3/2018
JP    10131490 A     5/1998
(Continued)

OTHER PUBLICATIONS

International Search Report mailed Mar. 24, 2022 for PCT/KR2021/017303.
(Continued)

*Primary Examiner* — Matthew P Travers
(74) *Attorney, Agent, or Firm* — CANTOR COLBURN LLP

(57) ABSTRACT

In a system for automatically manufacturing a pipe spool, when information on a pipe spool is input to a control unit, manufacturing of a spool pipe by cutting an original pipe, processing of a spool pipe, processing of a connection member, manufacturing of a straight pipe spool by welding
(Continued)

a spool pipe to a connection member, and manufacturing a three-dimensional spool by welding a straight pipe spool to the other straight pipe spool or a connection member may be automatically performed by a sensor, an automatic device or a robot included in each process and the control unit connected to each of the devices.

12 Claims, 26 Drawing Sheets

(51) Int. Cl.
    *B23K 37/02*     (2006.01)
    *B23K 101/06*     (2006.01)
    *B23K 101/10*     (2006.01)
    *F16L 13/02*     (2006.01)

(52) U.S. Cl.
    CPC ...... *B23K 2101/06* (2018.08); *B23K 2101/10* (2018.08); *F16L 13/02* (2013.01)

(58) Field of Classification Search
    CPC ..... Y10T 29/49428–4943; F16L 13/02; B23K 2101/06; B23K 2101/10; B23K 31/027; B23K 37/0276; B23D 21/00
See application file for complete search history.

(56) References Cited

U.S. PATENT DOCUMENTS

| 2014/0257001 | A1* | 9/2014 | Spicer | C07C 4/04 |
| | | | | 585/300 |
| 2015/0174661 | A1* | 6/2015 | Brandstrom | B23K 37/0276 |
| | | | | 228/9 |
| 2018/0001389 | A1* | 1/2018 | Atin | B23Q 17/2428 |
| 2019/0193180 | A1* | 6/2019 | Troyer | B23K 9/295 |

FOREIGN PATENT DOCUMENTS

| KR | 101215597 B1 | 12/2012 |
| KR | 20140021440 A | 2/2014 |
| KR | 101739334 B1 | 6/2017 |
| KR | 101990581 B1 | 6/2019 |
| WO | WO-2013006934 A2 * | 1/2013 | ......... B23K 37/0276 |

OTHER PUBLICATIONS

Korean Notice of Allowance for KR Application No. 10-2021-0139302 mailed on Sep. 8, 2023.

* cited by examiner

PIPING SPOOL AUTO MANUFACTURING SYSTEM

TECHNICAL FIELD

The present disclosure relates to a system for automatically manufacturing a pipe spool.

BACKGROUND ART

Chemical plants, industrial plants, or buildings may include complex piping facilities.

To install a piping facility in a chemical plant, an industrial plant, or a building, first, a plurality of pipe spools included in the piping facility may be manufactured in advance in a pipe spool fabrication plant. Thereafter, the plurality of manufactured pipe spools may be moved to a site such as a chemical plant, an industrial plant, or a building, and the plurality of pipe spools may be connected to each other at the site. The plurality of pipe spools connected to each other may be installed in a steel frame or civil structure included in a chemical plant, an industrial plant, or a building using a support, and the plurality of pipe spools connected to each other may be connected to, for example, a column, a vessel, and a tank, or a stationary such as a heat exchanger, or a rotating air flow component such as a compressor or a pump, and the entire piping facility may be constructed in a chemical plant, an industrial plant, or a building.

A pipe spool included in a piping facility such as a chemical plant, an industrial plant, or a building may have different shapes and sizes. For this reason, the pipe spool may be one of representative products of which a variety of types may be manufactured in small amount, and it was difficult to automatically manufacture the product. Accordingly, generally, an automated device may only be applied to a portion of processes for manufacturing a pipe spool having a simplified shape, and a pipe spool having a complicated shape may be manufactured in respective worksites by manually performing cutting a member such as a pipe, processing the member, moving the member, and welding the pipe to a fitting member, as illustrated in FIG. 26.

Also, generally, a number of tasks from drawing management, member management, and inspection tasks essential for manufacturing a pipe spool have still been processed based on surge, and manpower to take charge of these tasks has been required in each manufacturing process.

DISCLOSURE

Technical Problem

An aspect of the present disclosure is to automatically manufacture a pipe spool when information on a pipe spool is input to a control unit, the control unit may allow a series of processes for manufacturing the pipe spool to be continuously performed without intervention from an operator or surge.

Another aspect of the present disclosure is to automatically perform manufacturing of a spool pipe through cutting of an original pipe, processing of a spool pipe, processing of a connection member, manufacturing of a straight pipe spool by welding a spool pipe to a connection member, manufacturing of a three-dimensional spool by welding a straight pipe spool to the other straight pipe spool or a connection member, which may be main processes in manufacturing a pipe spool, by a sensor, an automatic device or a robot included in each process and a control unit connected to each of the devices.

Another aspect of the present disclosure is to automatically perform moving a spool pipe, a connection member, a straight pipe spool, or a three-dimensional spool from one process to another process by a robot connected to a control unit.

Another aspect of the present disclosure is to, by recording information on a spool pipe to be manufactured in each of a spool pipe and a connection member, allow an operator to easily check the information on the pipe spool by means of a mobile device, and to allow, in a subsequent process for painting a pipe spool or a process for inspecting a pipe spool, the painting and the inspection to be performed by easily using the information on the pipe spool.

Another aspect of the present disclosure is to, while manufacturing a spool pipe by cutting an original pipe, processing a spool pipe or a connection member, allow a control unit to sort a material which is able to be used for manufacturing a pipe spool or a material not able to be used for manufacturing a pipe spool by measurement through a sensor, and to manage a material able to be used for manufacturing a pipe spool and also a material not able to be used for manufacturing a pipe spool.

Another aspect of the present disclosure is to, when manufacturing a straight pipe spool by welding a spool pipe to a connection member, and manufacturing a three-dimensional spool by welding a straight pipe spool to another straight pipe spool or a connection member, perform no-tack welding by a robot and flat welding.

Another aspect of the present disclosure is to process an end of a spool pipe and an end of a connection member to perform no-tack welding by a robot.

Technical Solution

According to an aspect of the present disclosure, a system for automatically manufacturing a pipe spool includes a pipe cutting unit including a pipe cutter for cutting an original pipe to have a predetermined desired length to manufacture a spool pipe; a spool pipe bevel processing unit including a spool pipe bevel processing device for forming a welding bevel in an end of the spool pipe; a connection member bevel processing unit including a connection member bevel processing device for forming a welding bevel in an end of the connection member; a straight pipe spool manufacturing unit including a straight pipe spool welding site and a welding robot, and manufacturing a straight pipe spool by welding the connection member to the spool pipe; a three-dimensional spool manufacturing unit including a three-dimensional spool welding site and a welding robot, and manufacturing a three-dimensional spool by welding the straight pipe spool to the other straight pipe spool or the connection member; a handling unit including a handling robot and a gantry crane robot and moving the spool pipe, the connection member, the straight pipe spool, or the three-dimensional spool or gripping the connection member or the straight pipe spool during welding; and a control unit for, when information on a pipe spool is input, controlling each of the pipe cutting unit, the spool pipe bevel processing unit, the connection member bevel processing unit, the straight pipe spool manufacturing unit, the three-dimensional spool manufacturing unit, and the handling unit and allowing a pipe spool to be manufactured according to the input information without intervention from an operator or a surge.

The pipe cutting unit may measure a length and thickness of the original pipe and may cut the original pipe with the pipe cutter, the measured length and thickness of the original pipe may be transmitted to the control unit, and information on a pipe spool to be manufactured, input to the control unit, may be recorded in the spool pipe.

When a residual pipe, which is a portion of the original pipe remaining after manufacturing the spool pipe, is longer than a length of another spool pipe to be manufactured, the control unit may be configured to cut the residual pipe with the pipe cutter and to manufacture the residual pipe as another spool pipe, and when the residual pipe is shorter than a length of another spool pipe to be manufactured, the control unit may be configured to discharge the residual pipe from the pipe cutting unit and to manage the residual pipe separately.

The spool pipe bevel processing unit may measure a shape, circularity, a thickness, and a center of an end of the spool pipe and may transmit the measurements to the control unit, and the control unit may determine whether to process the end of the spool pipe, and when it is determined that it is possible to process the end, the control unit may perform processing of the end of the spool pipe, and when it is not possible to process the end, the control unit may discharge the spool pipe from the spool pipe bevel processing unit.

The spool pipe bevel processing unit may allow a J-shaped welding bevel for automatic robot welding or a V-shape welding bevel for manual welding to be formed in the end of the spool pipe by the spool pipe bevel processing device, and may perform processing of inner and outer diameters of the end of the spool pipe in which the welding bevel is formed.

The connection member bevel processing unit may measure a shape, circularity, a thickness, and a center of the end of the connection member and may transmit the measurements to the control unit, and the control unit may determine whether to process the end of the connection member, and when it is determined that it is possible to process the end, the control unit may record information on a pipe spool to be manufactured, input to the control unit, in the connection member, and may perform processing of the end of the connection member, and when it is determined that it is not possible to process the end, the control unit may discharge the connection member from the connection member bevel processing unit.

The connection member bevel processing unit may allow a J-shaped welding bevel for automatic robot welding to be formed in the end of the spool pipe by the connection member bevel processing device, and may perform processing of inner and outer diameters of the end of the connection member in which the welding bevel is formed.

To fit up bevel surfaces and to perform no-tack welding by a robot by the straight pipe spool manufacturing unit or the three-dimensional spool manufacturing unit, the spool pipe bevel processing unit may allow a J-shaped welding bevel to be formed at an end of the spool pipe by the spool pipe bevel processing device, and the connection member bevel processing unit may allow a J-shaped welding bevel to be formed at an end of the connection member by the connection member bevel processing device.

The spool pipe bevel processing unit may perform processing of inner and outer diameters of an end of the spool pipe in which the welding bevel is formed, and the connection member bevel processing unit may perform processing of inner and outer diameters of an end of the connection member in which the welding bevel is formed.

In the straight pipe spool manufacturing unit, bevel surfaces may be fit up as the spool pipe is gripped by the straight pipe spool welding site and the connection member is gripped by the handling robot, a root portion between the spool pipe and the connection member may be welded by a root-welding robot included in the welding robot, and thereafter, the other portion between the spool pipe and the connection member may be welded by a fill and cap welding robot included in the welding robot.

In the three-dimensional spool manufacturing unit, bevel surfaces may be fit up as the straight pipe spool is gripped by the three-dimensional spool welding site and the other straight pipe spool or the connection member is gripped by the handling robot, a root portion between the straight pipe spool and the other straight pipe spool or the connection member may be welded by a root-welding robot included in the welding robot, and thereafter, the other portion between the straight pipe spool and the other straight pipe spool or the connection member may be welded by a fill and cap welding robot included in the welding robot.

The information on the pipe spool may be piping component file (PCF) data of the pipe spool.

Advantageous Effects

According to the aforementioned example embodiments, manufacturing of a spool pipe by cutting an original pipe, processing of a spool pipe, processing of a connection member, manufacturing of a straight pipe spool by welding a spool pipe to a connection member, manufacturing a three-dimensional spool by welding a straight pipe spool to the other straight pipe spool or a connection member, which may be main processes for manufacturing a pipe spool, may be automatically performed by the sensor, the automatic device or the robot included in each process and the control unit connected to each of the devices.

Also, according to the example embodiments, the moving of a spool pipe, a connection member, a straight pipe spool, or a three-dimensional spool from one process to another process may be automatically performed by a robot connected to a control unit.

Also, according to the example embodiments, by recording information on a spool pipe to be manufactured in each of a spool pipe and a connection member, an operator may easily check the information on the pipe spool by means of a mobile device, and in a subsequent process for painting a pipe spool or a process for inspecting a pipe spool, the painting and the inspection may be performed by easily using the information on the pipe spool.

Also, according to the example embodiments, while manufacturing a spool pipe by cutting an original pipe, processing a spool pipe or a connection member, a control unit may sort a material which is able to be used for manufacturing a pipe spool or a material not able to be used for manufacturing a pipe spool by measurement through a sensor, and may manage a material able to be used for manufacturing a pipe spool and also a material not able to be used for manufacturing a pipe spool.

Also, according to the example embodiments, when manufacturing a straight pipe spool by welding a spool pipe to a connection member, and manufacturing a three-dimensional spool by welding a straight pipe spool to another straight pipe spool or a connection member, no-tack welding by a robot and flat welding may be performed.

Also, according to the example embodiments, an end of a spool pipe and an end of a connection member may be processed to perform no-tack welding by a robot.

Also, according to the example embodiments, when information on a pipe spool is input to a control unit, the control unit may allow a series of processes for manufacturing the pipe spool to be continuously performed without intervention from an operator or surge, such that a pipe spool may be automatically manufactured according to the input information.

BEST MODE FOR INVENTION

Figure 1:
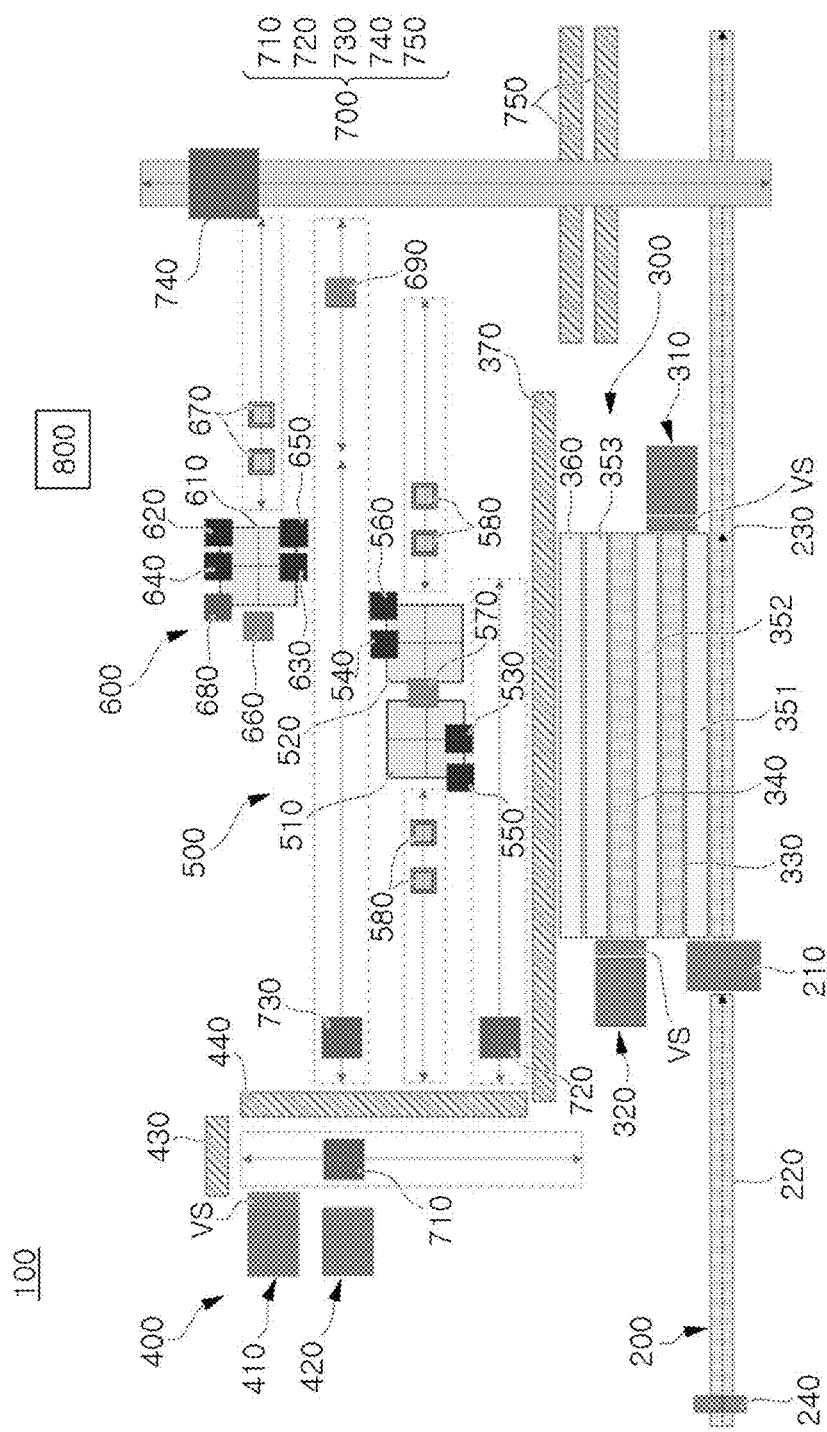
FIG. 1 is a diagram illustrating a system for automatically manufacturing a pipe spool according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided such that this disclosure will be thorough and complete, and will fully convey the scope of the disclosure to those skilled in the art. Accordingly, shapes and sizes of the elements in the drawings may be exaggerated for clarity of description. An expression used in the singular encompasses the expression of the plural, unless it has a clearly different meaning in the context, and elements having the same function within the scope of the same concept represented in the drawing of each example embodiment will be described using the same reference numeral.

Hereinafter, an example embodiment of the system for automatically manufacturing a pipe spool according to the present disclosure will be described with reference to FIGS. 1 to 25.

FIG. 1 is a diagram illustrating a system for automatically manufacturing a pipe spool according to an example embodiment.

Figure 2:
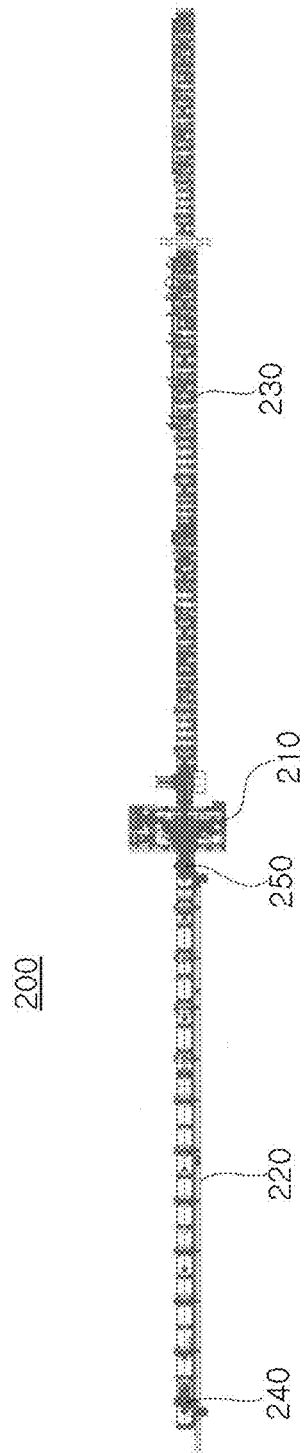
FIG. 2 is a diagram illustrating a pipe cutting unit of a system for automatically manufacturing a pipe spool according to an example embodiment of the present disclosure.
Figure 3:
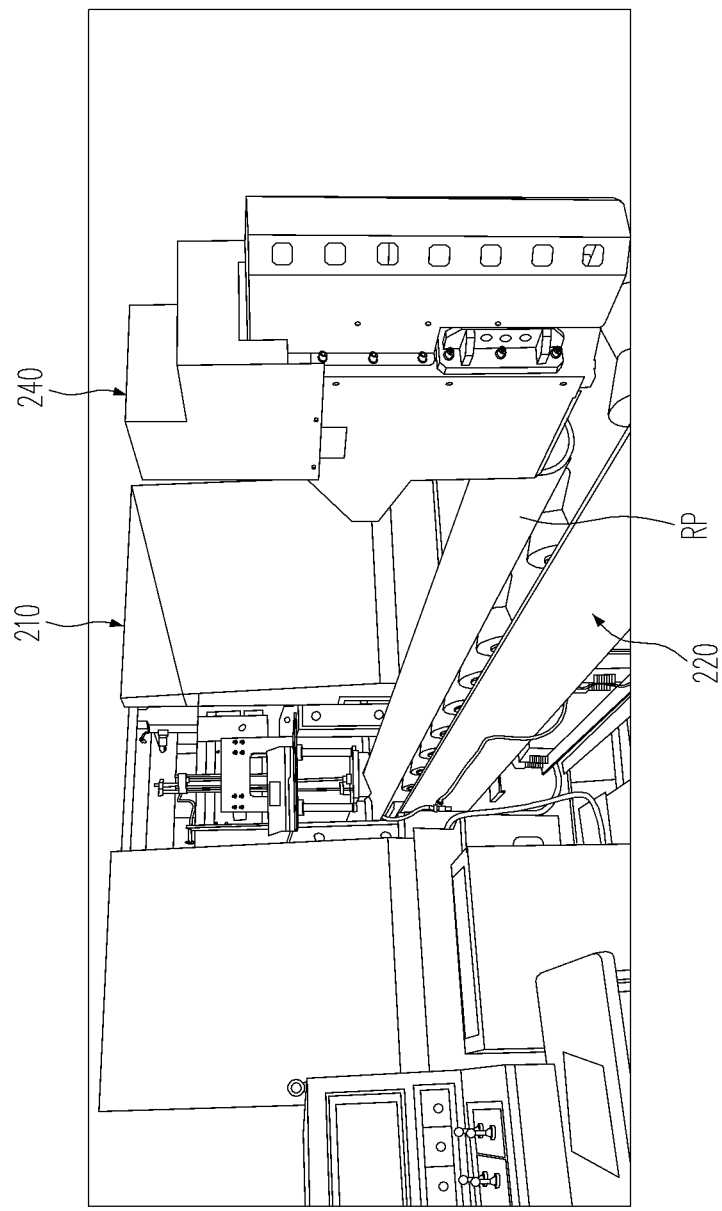
FIG. 3 is an image of an example of cutting an original pipe by a pipe cutter in a pipe cutting unit of a system for automatically manufacturing a pipe spool according to an example embodiment of the present disclosure.

FIG. 2 is a diagram illustrating a pipe cutting unit of a system for automatically manufacturing a pipe spool according to an example embodiment. FIG. 3 is an image of an example of cutting an original pipe by a pipe cutter in a pipe cutting unit of a system for automatically manufacturing a pipe spool according to an example embodiment.

Figure 4:
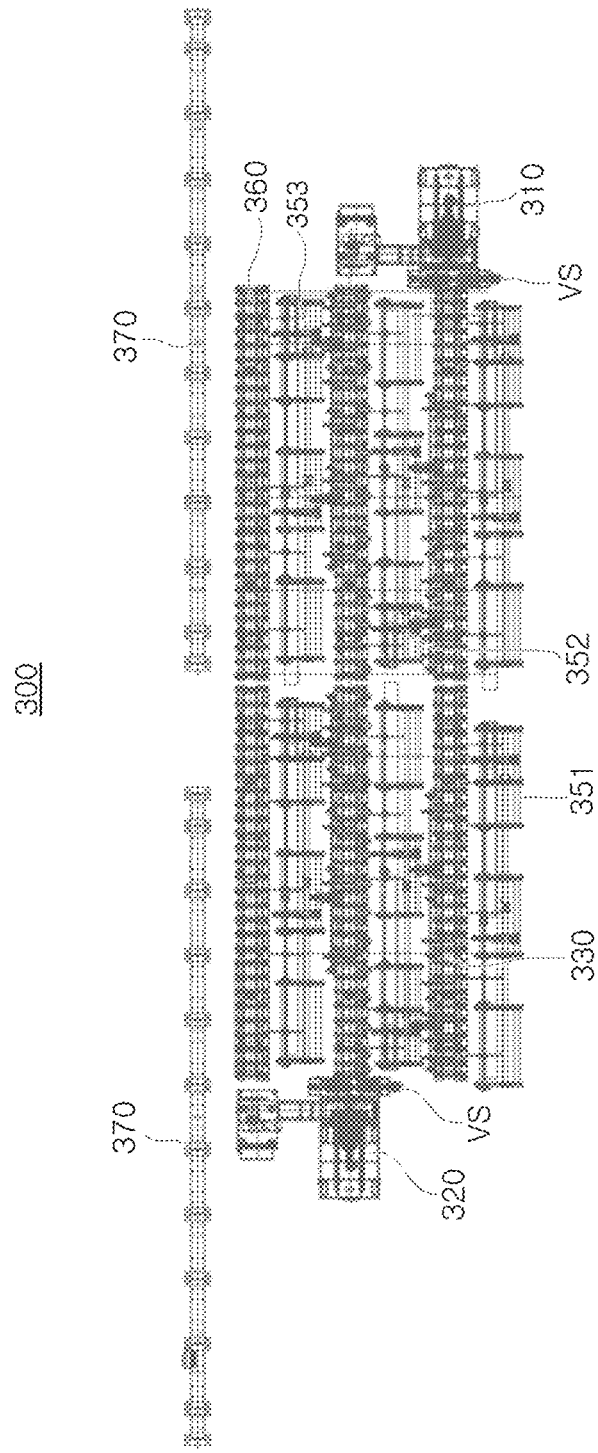
FIG. 4 is a diagram illustrating a spool pipe bevel processing unit of a system for automatically manufacturing a pipe spool according to an example embodiment of the present disclosure.

FIG. 4 is a diagram illustrating a spool pipe bevel processing unit of a system for automatically manufacturing a pipe spool according to an example embodiment.

Figure 5:
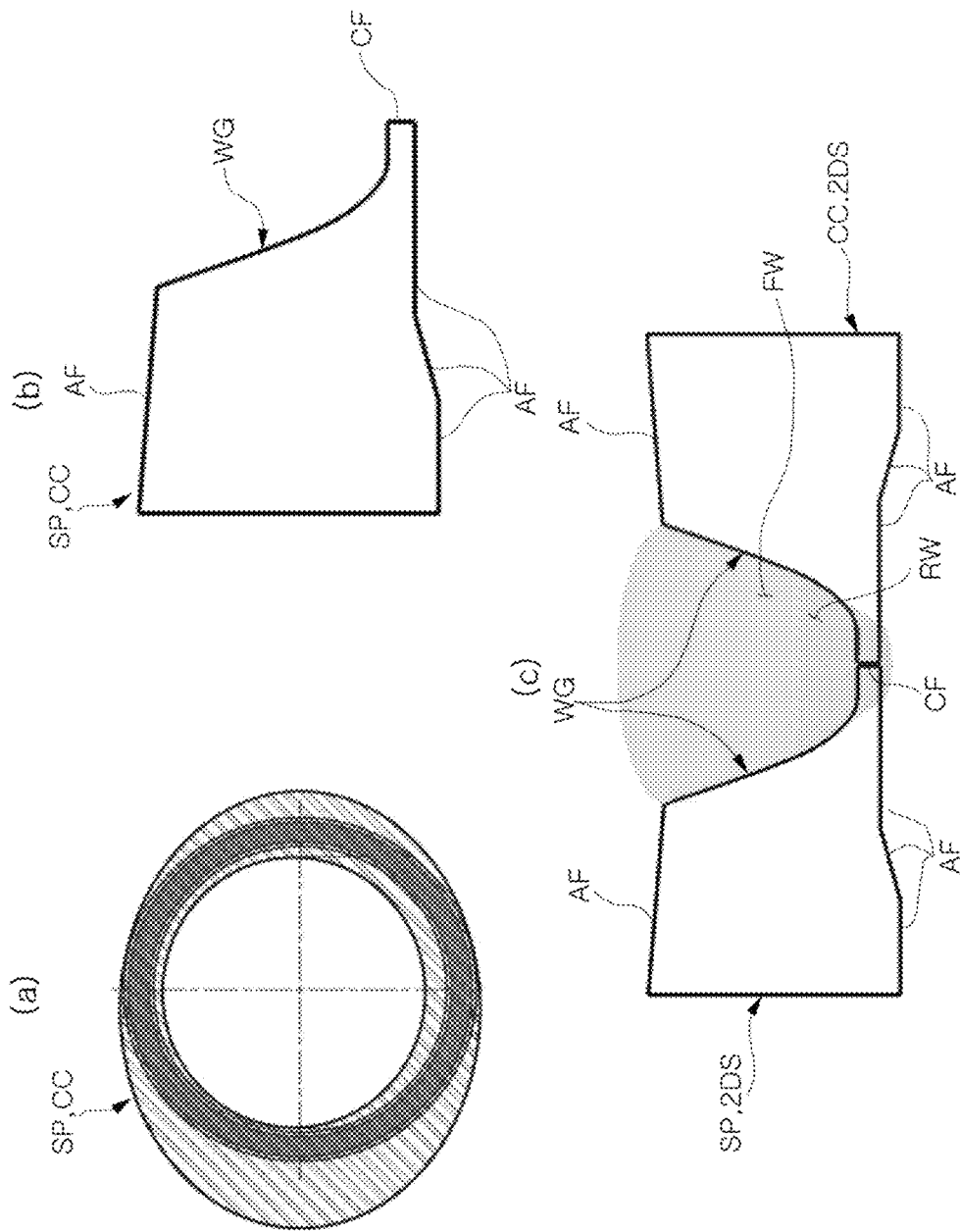
FIG. 5 is a diagram illustrating an example of measuring whether processing of a J-shaped welding bevel and processing of inner and outer diameters is able to be performed on an end of a spool pipe or a connection member, a diagram illustrating an end of a spool pipe or an end of a connection member in which a J-shaped welding bevel is formed and inner and outer diameters are processed, a diagram illustrating an example of, while a J-shaped welding bevel is formed and inner and outer diameters are processed, welding a spool pipe to a connection member or welding a straight pipe spool to another straight pipe spool according to an example embodiment of the present disclosure.

FIG. 5 is a diagram illustrating an example of measuring whether processing of a J-shaped welding bevel and processing of inner and outer diameters is able to be performed on an end of a spool pipe or a connection member, a diagram illustrating an end of a spool pipe or an end of a connection member in which a J-shaped welding bevel is formed and inner and outer diameters are processed, a diagram illustrating an example of, while a J-shaped welding bevel is formed and inner and outer diameters are processed, welding a spool pipe to a connection member or welding a straight pipe spool to another straight pipe spool according to an example embodiment.

Figure 6:
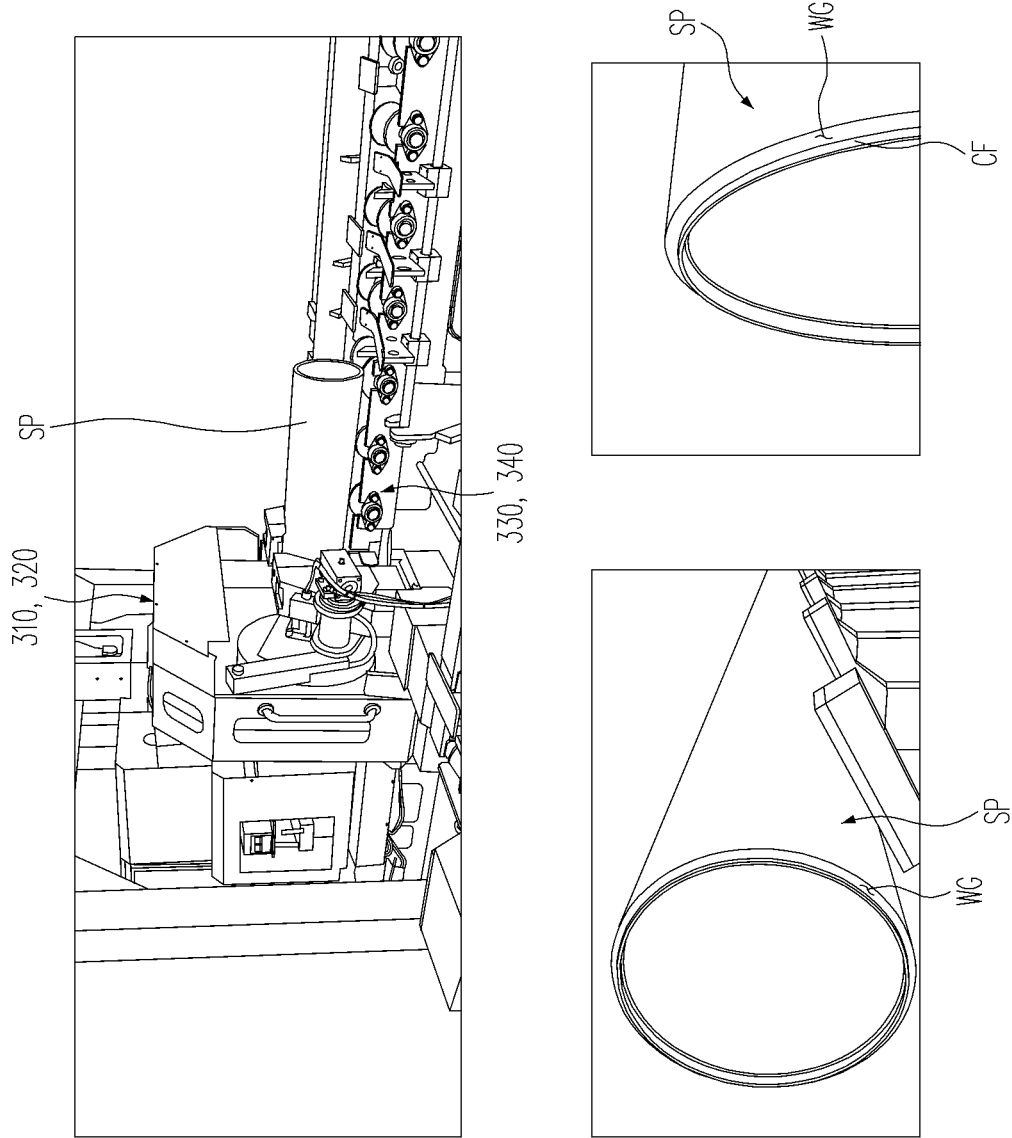
FIG. 6 is an image of an example of processing of an end of a spool pipe by a spool pipe bevel processing device of a spool pipe bevel processing unit of a system for automatically manufacturing a pipe spool, and the processed end of the spool pipe according to an example embodiment of the present disclosure.

FIG. 6 is an image of an example of processing of an end of a spool pipe by a spool pipe bevel processing device of a spool pipe bevel processing unit of a system for automatically manufacturing a pipe spool, and the processed end of the spool pipe according to an example embodiment.

Figure 7:
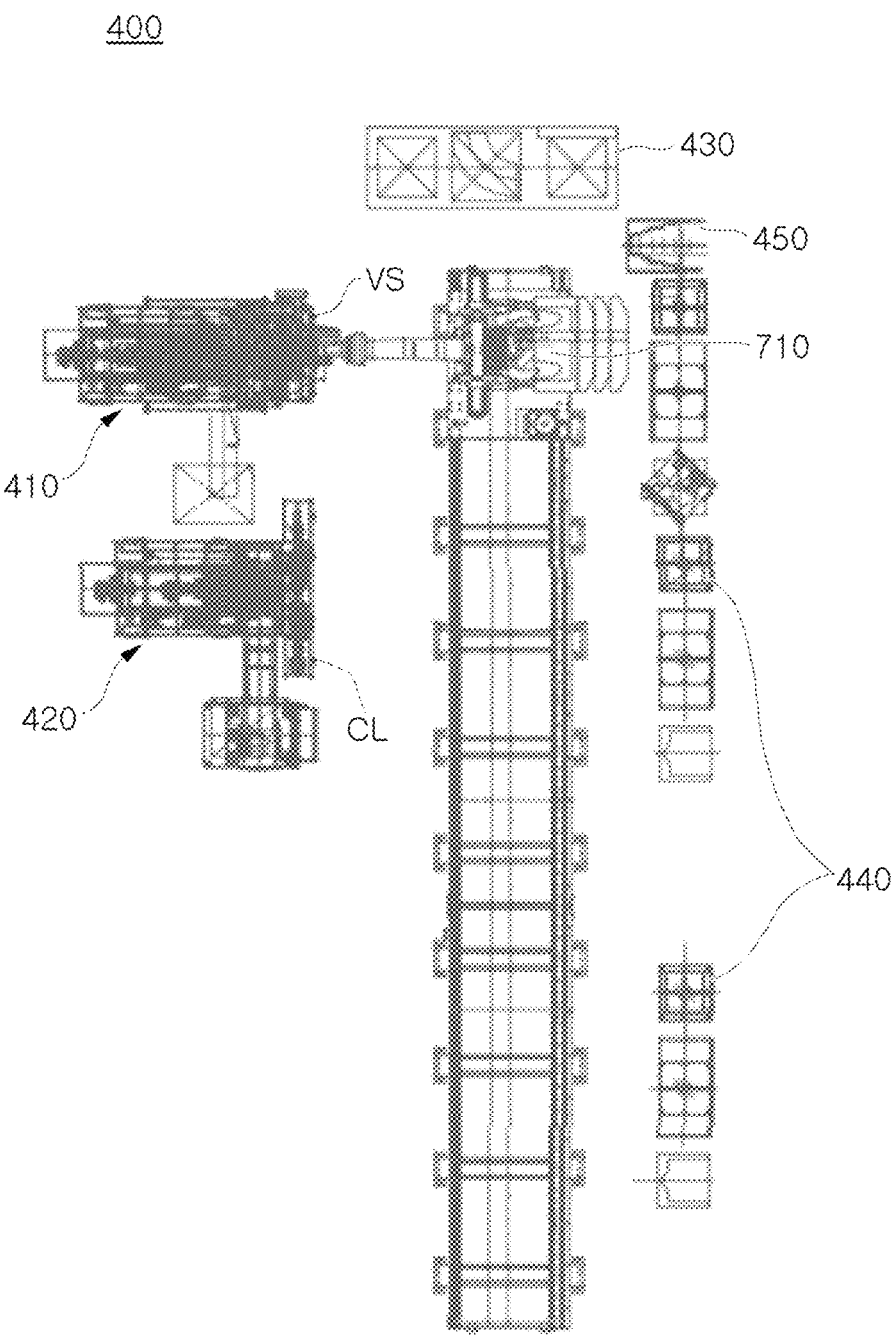
FIG. 7 is a diagram illustrating a connection member bevel processing unit of a system for automatically manufacturing a pipe spool according to an example embodiment of the present disclosure.

FIG. 7 is a diagram illustrating a connection member bevel processing unit of a system for automatically manufacturing a pipe spool according to an example embodiment.

Figure 8:
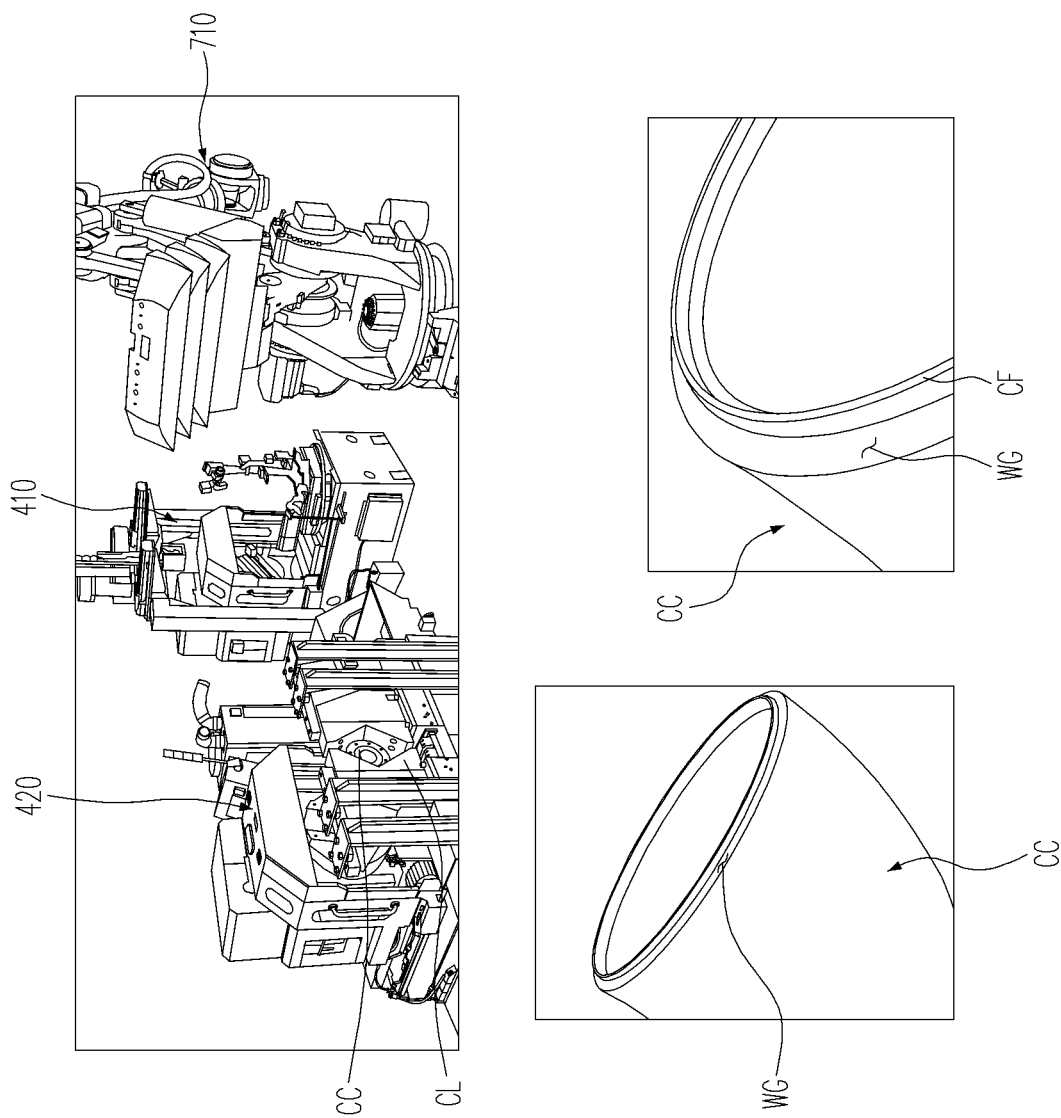
FIG. 8 is an image of an example of processing of an end of a connection member by a connection member bevel processing device of a connection member bevel processing unit of a system for automatically manufacturing a pipe spool, and the processed end of the connection member according to an example embodiment of the present disclosure.

FIG. 8 is an image of an example of processing of an end of a connection member by a connection member bevel processing device of a connection member bevel processing unit of a system for automatically manufacturing a pipe spool, and the processed end of the connection member according to an example embodiment.

Figure 9:
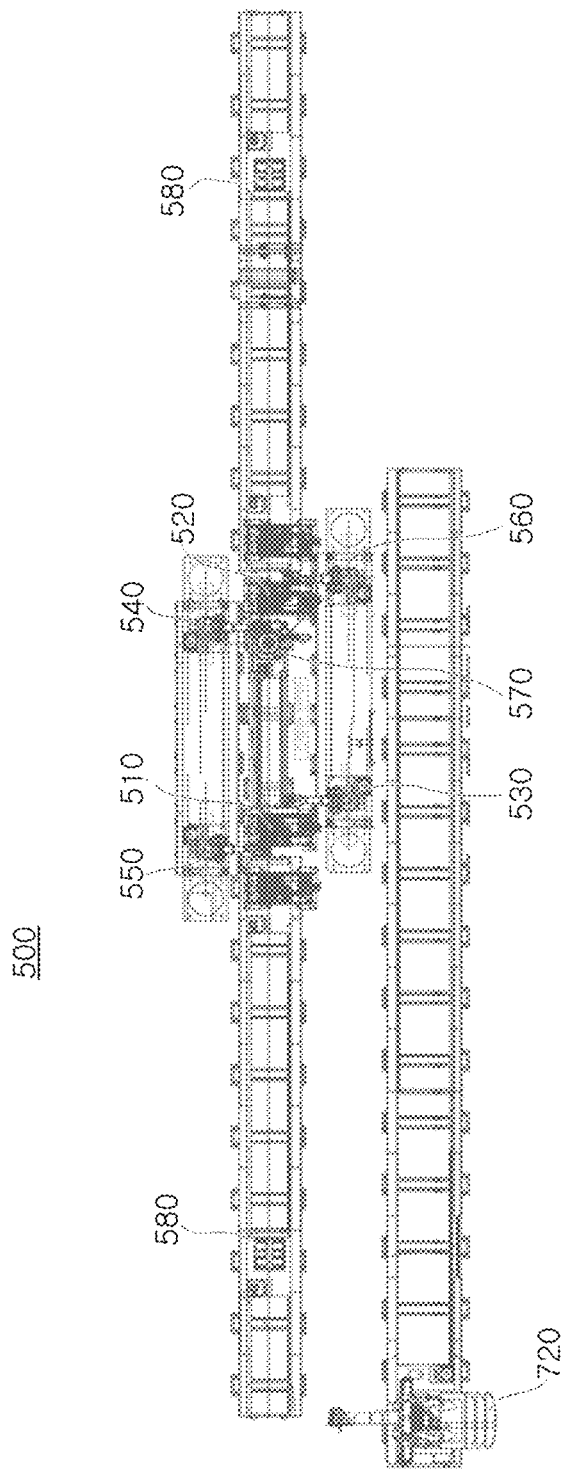
FIG. 9 is a diagram illustrating a straight pipe spool manufacturing unit of a system for automatically manufacturing a pipe spool according to an example embodiment of the present disclosure.

FIG. 9 is a diagram illustrating a straight pipe spool manufacturing unit of a system for automatically manufacturing a pipe spool according to an example embodiment.

Figure 10:
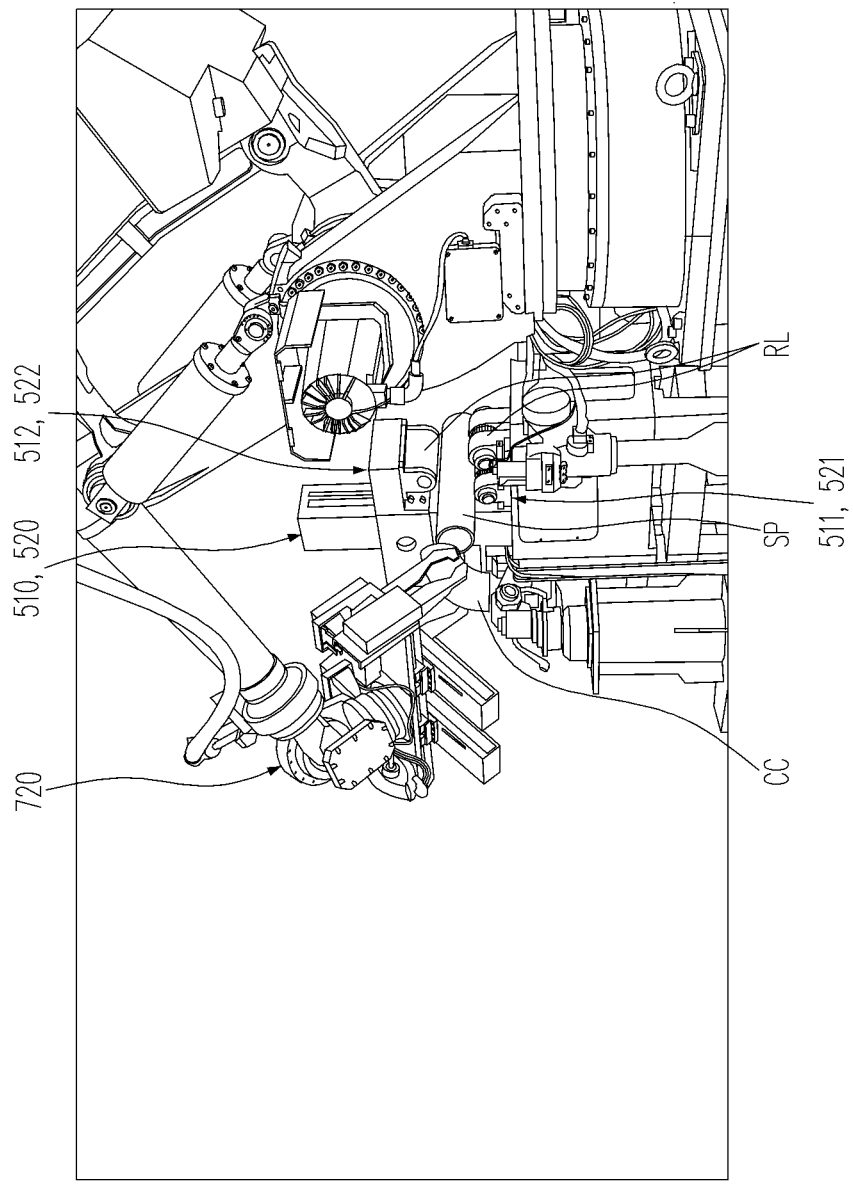
FIGS. 10 to 12 are images of an example in which, while a spool pipe is gripped by a straight pipe spool welding site of a straight pipe spool manufacturing unit of a system for automatically manufacturing a pipe spool, and a connection member is gripped by a second handling robot of a handling unit, as a region between an end of the spool pipe and an end of the connection member is sensed by a first gap sensing robot, bevel surfaces the spool pipe and the connection member are aligned according to an example embodiment of the present disclosure.
Figure 11:
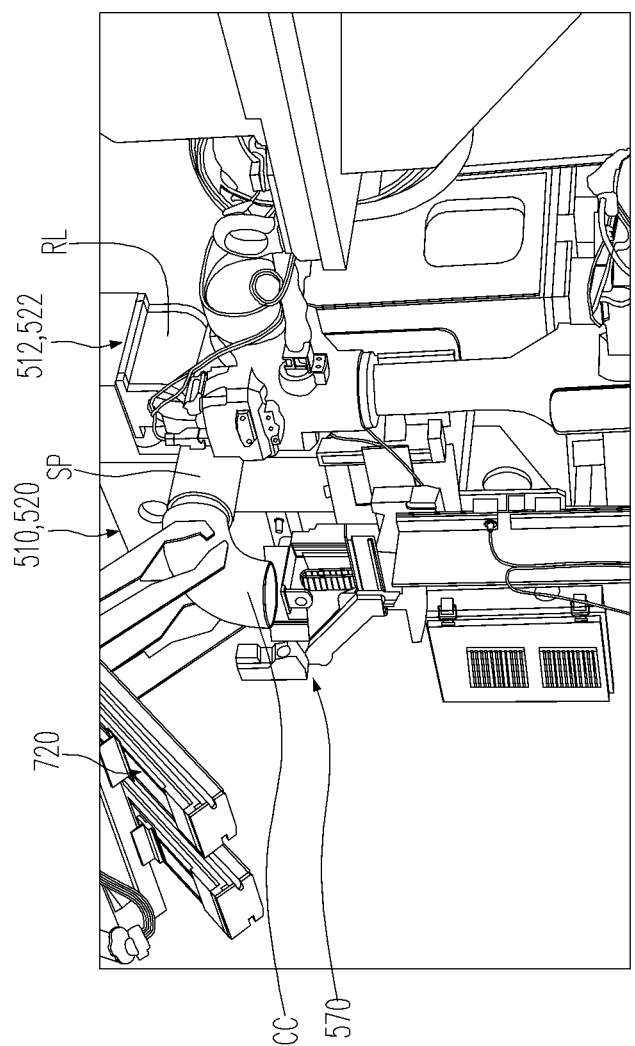
Figure 12:
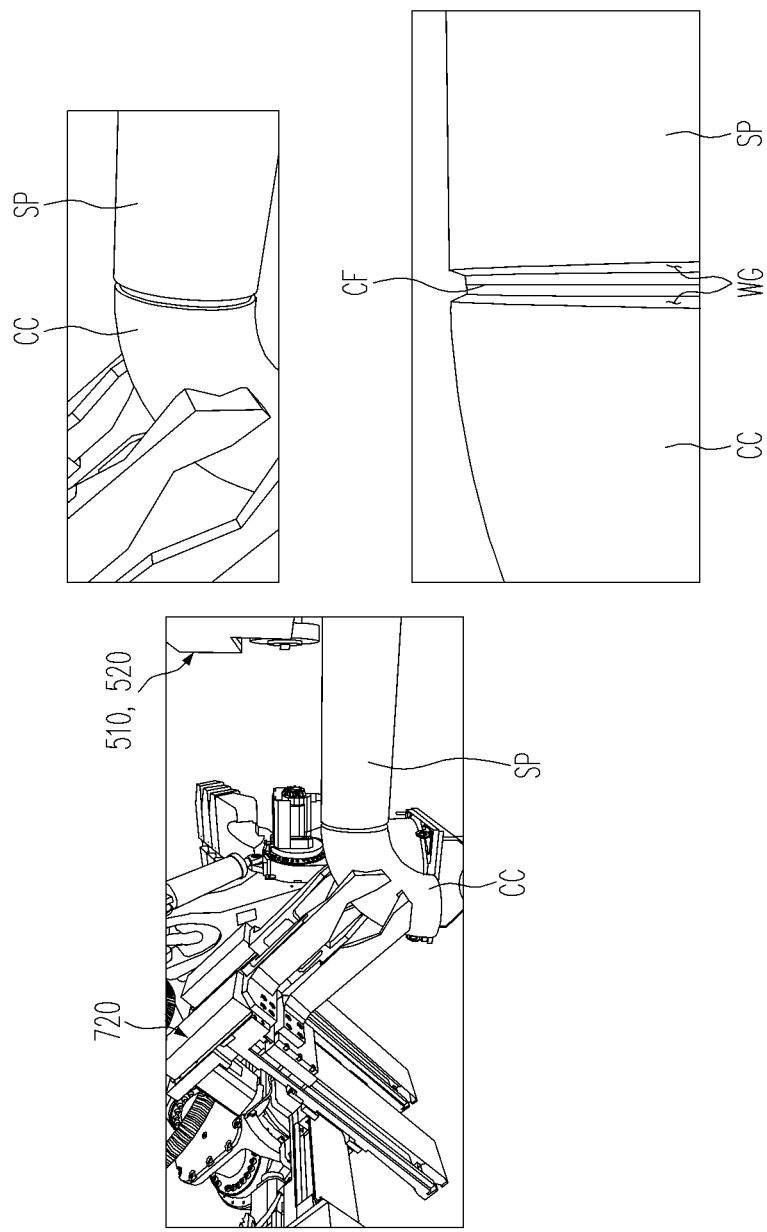

FIGS. 10 to 12 are images of an example in which, while a spool pipe is gripped by a straight pipe spool welding site of a straight pipe spool manufacturing unit of a system for automatically manufacturing a pipe spool, and a connection member is gripped by a second handling robot of a handling unit, as a region between an end of the spool pipe and an end of the connection member is sensed by a first gap sensing robot, bevel surfaces the spool pipe and the connection member are aligned according to an example embodiment.

Figure 13:
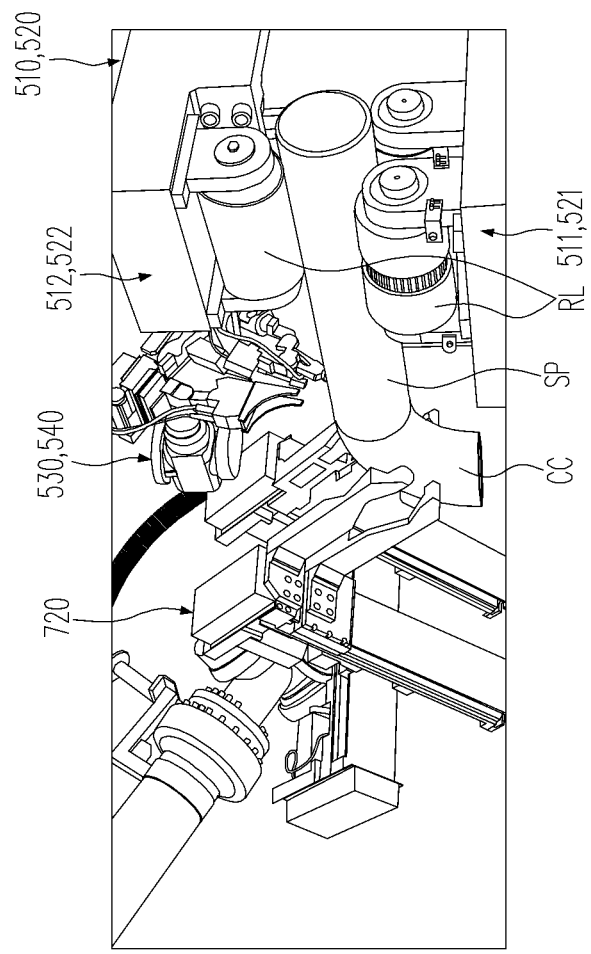
FIG. 13 is an image of an example in which a root portion of a welding bevel between an end of the spool pipe and an end of the connection member is welded by a root-welding robot of a straight pipe spool manufacturing unit of a system for automatically manufacturing a pipe spool according to an example embodiment of the present disclosure.
Figure 14:
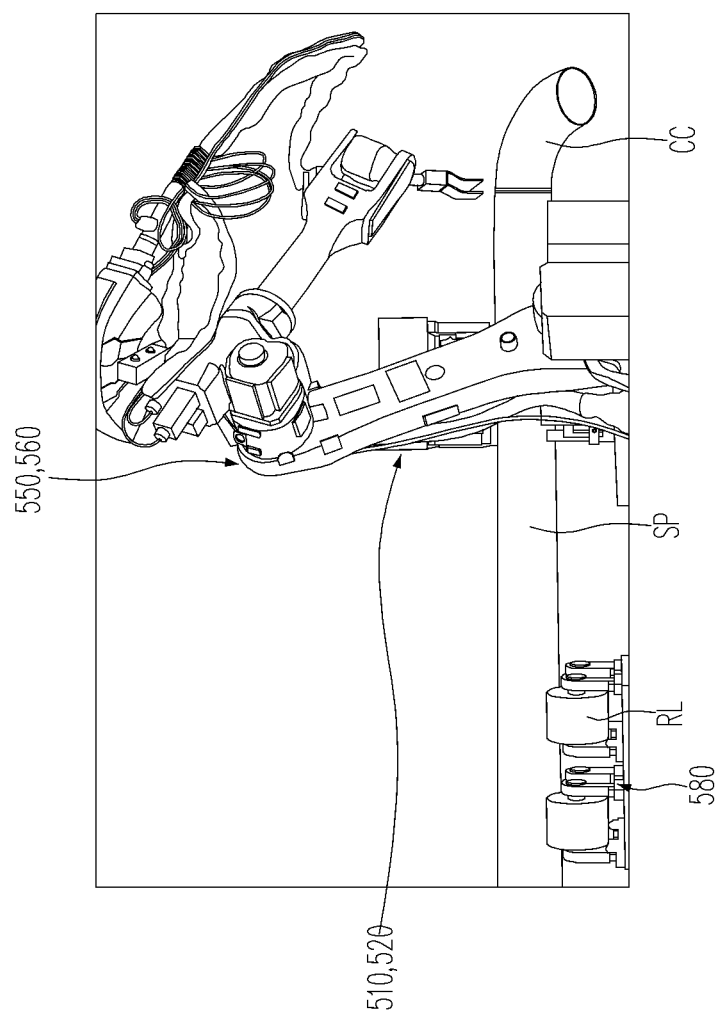
FIG. 14 is an image of an example in which the other root portion of a welding bevel between an end of a spool pipe and an end of the connection member is welded by a fill and cap welding robot of a straight pipe spool manufacturing unit of a system for automatically manufacturing a pipe spool according to an example embodiment of the present disclosure.

FIG. 13 is an image of an example in which a root portion of a welding bevel between an end of the spool pipe and an end of the connection member is welded by a root-welding robot of a straight pipe spool manufacturing unit of a system for automatically manufacturing a pipe spool according to an example embodiment. FIG. 14 is an image of an example in which the other root portion of a welding bevel between an end of a spool pipe and an end of the connection member is welded by a fill and cap welding robot of a straight pipe spool manufacturing unit of a system for automatically manufacturing a pipe spool according to an example embodiment.

Figure 15:
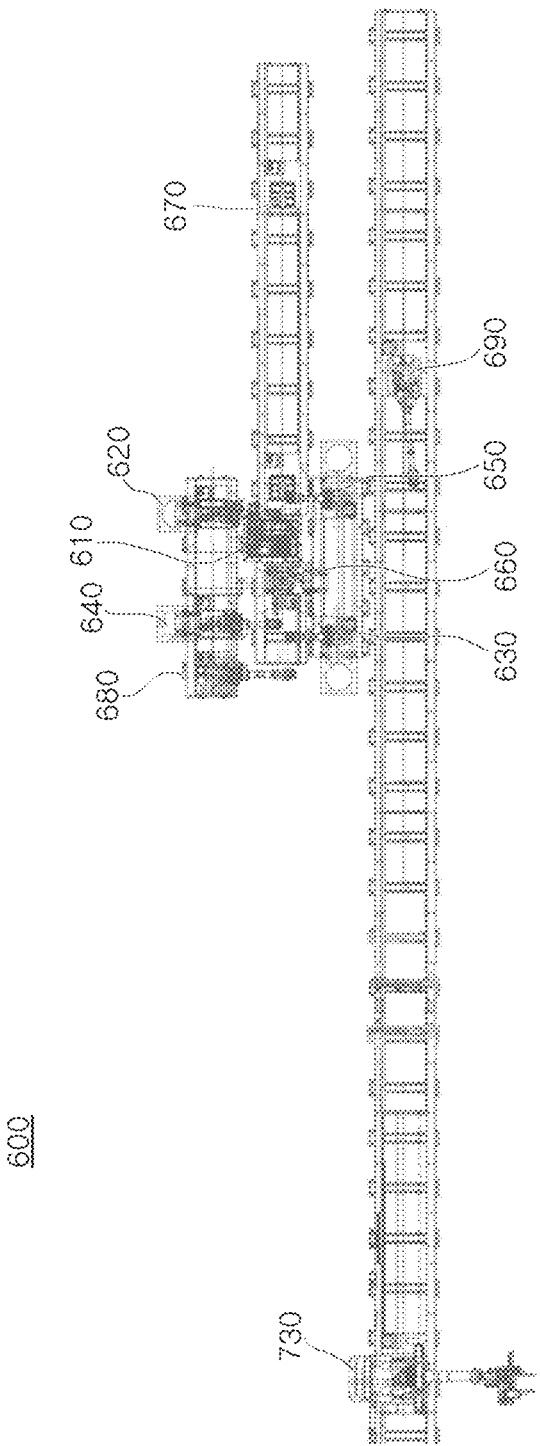
FIG. 15 is a diagram illustrating a three-dimensional spool manufacturing unit of a system for automatically manufacturing a pipe spool according to an example embodiment of the present disclosure.

FIG. 15 is a diagram illustrating a three-dimensional spool manufacturing unit of a system for automatically manufacturing a pipe spool according to an example embodiment.

Figure 16:
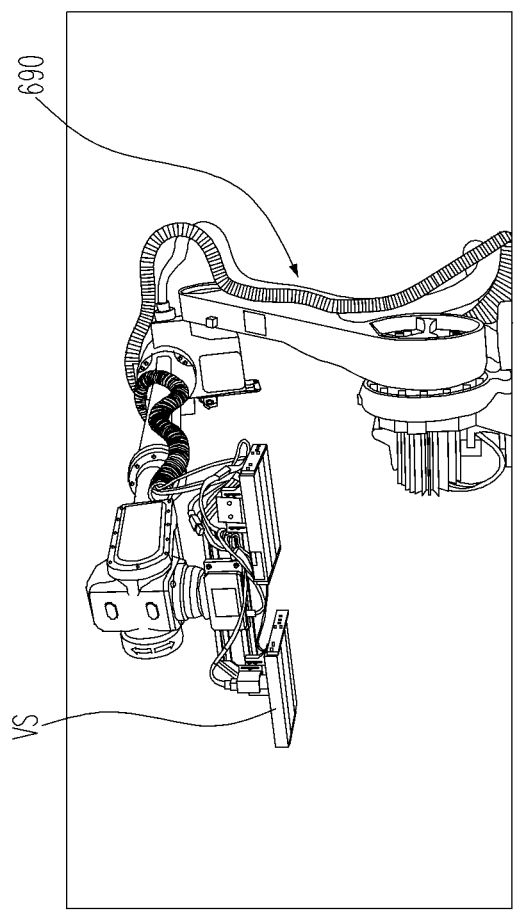
FIG. 16 is an image of an angle sensing robot of a system for automatically manufacturing a pipe spool according to an example embodiment of the present disclosure.

FIG. 16 is an image of an angle sensing robot of a system for automatically manufacturing a pipe spool according to an example embodiment.

Figure 17:
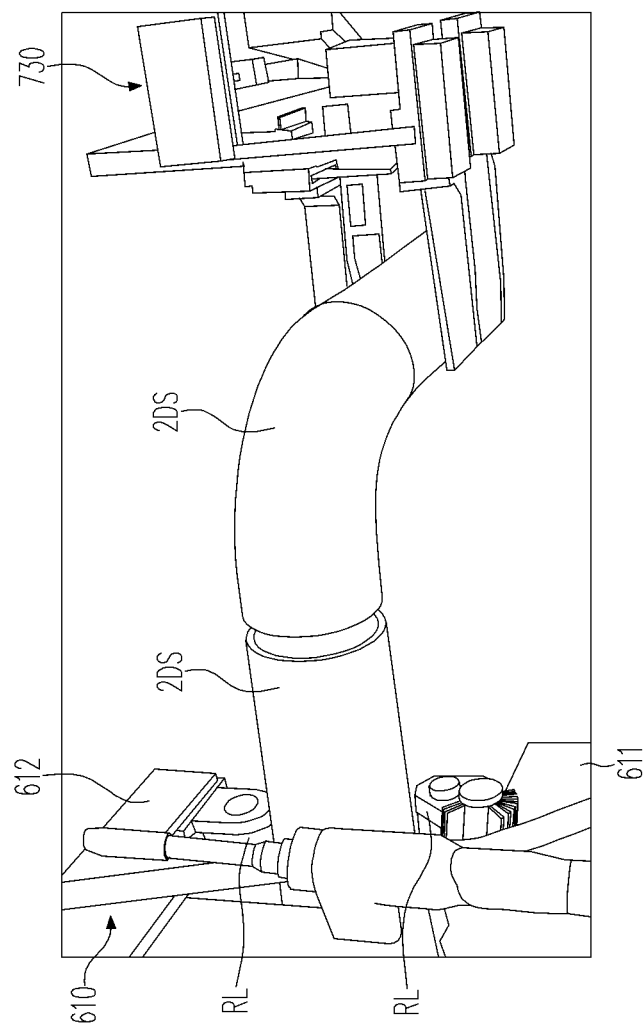
FIGS. 17 to 19 are images of an example in which, while a spool pipe is gripped by a three-dimensional spool welding site of a three-dimensional spool manufacturing unit of a system for automatically manufacturing a pipe spool, and another straight pipe spool or a connection member is gripped by a third handling robot of a handling unit, as a region between an end of the straight pipe spool and an end of another straight pipe spool or an end of the connection member is sensed by a second gap sensing robot, bevel surfaces another spool pipe and the connection member are aligned according to an example embodiment of the present disclosure.
Figure 18:
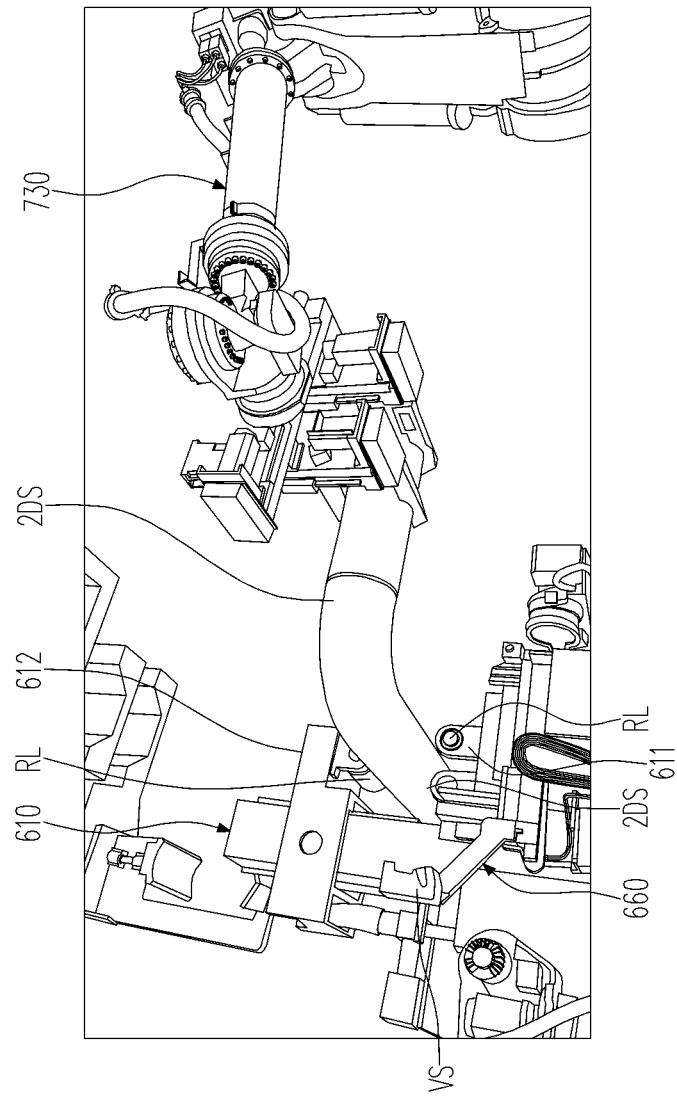
Figure 19:
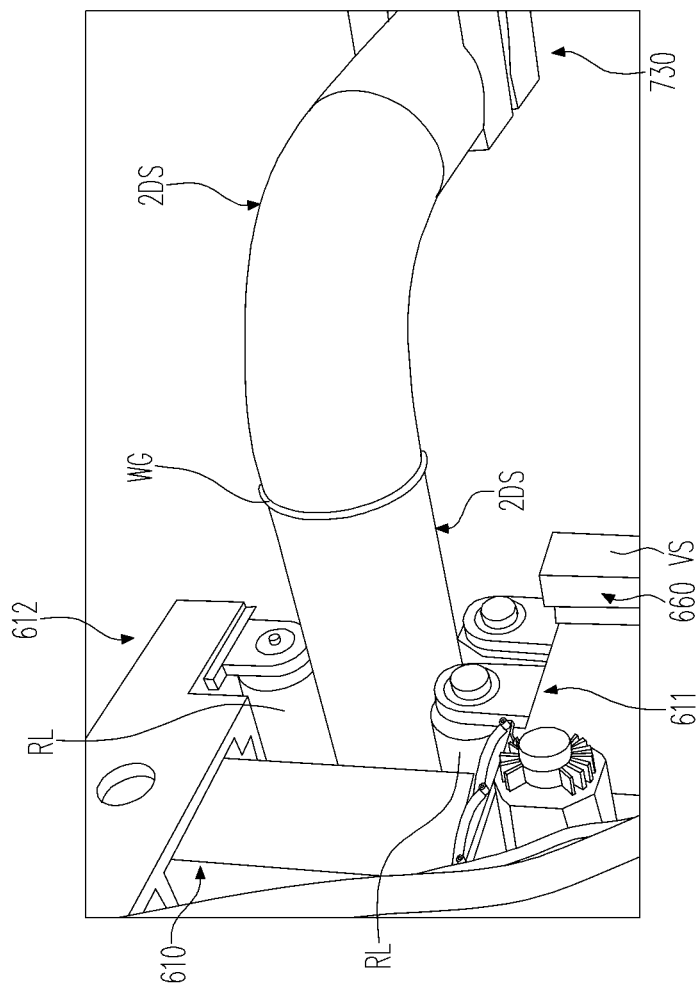

FIGS. 17 to 19 are images of an example in which, while a spool pipe is gripped by a three-dimensional spool welding site of a three-dimensional spool manufacturing unit of a system for automatically manufacturing a pipe spool, and another straight pipe spool or a connection member is gripped by a third handling robot of a handling unit, as a region between an end of the straight pipe spool and an end of another straight pipe spool or an end of the connection member is sensed by a second gap sensing robot, bevel surfaces another spool pipe and the connection member are aligned according to an example embodiment.

Figure 20:
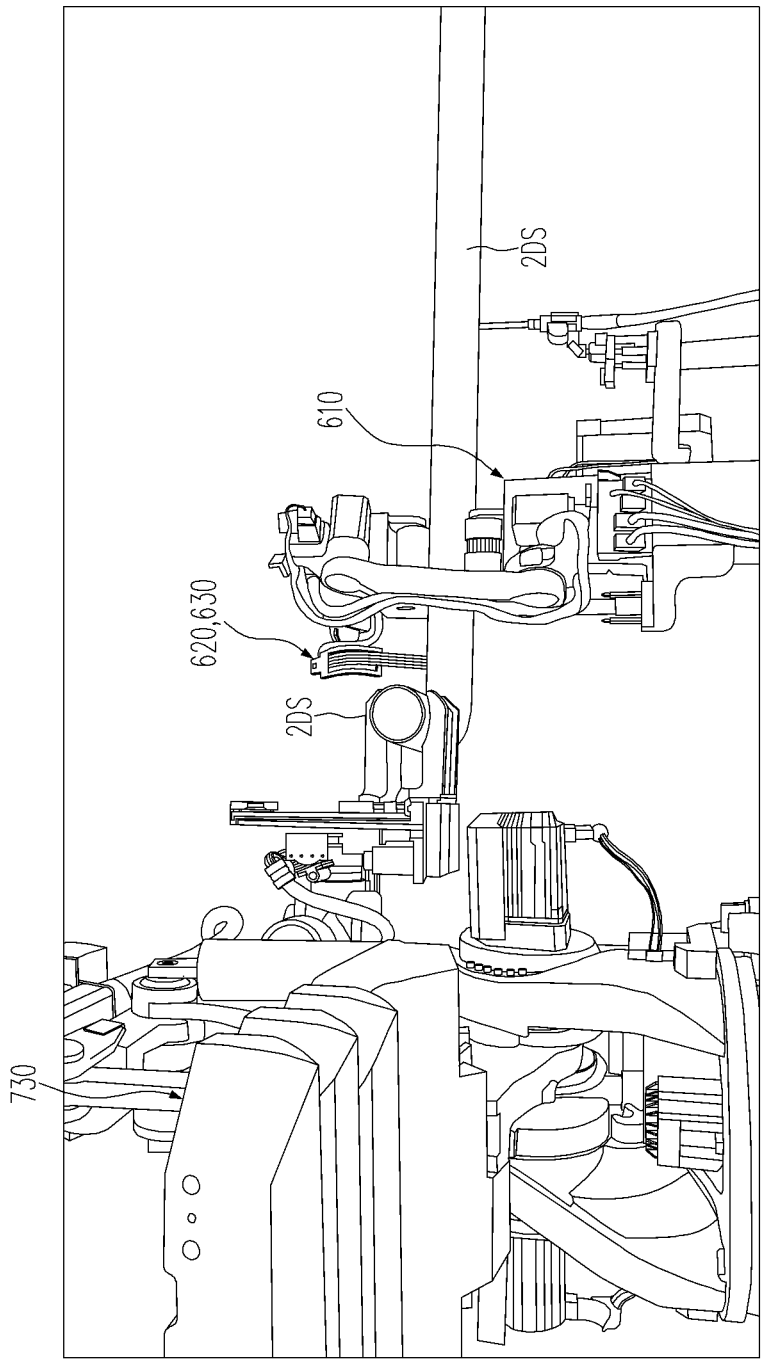
FIG. 20 is an image of an example in which a root portion of a welding bevel between an end of a straight pipe spool and an end of another straight pipe spool or an end of the connection member is welded by a root-welding robot of a straight pipe spool manufacturing unit of a system for automatically manufacturing a pipe spool according to an example embodiment of the present disclosure.
Figure 21:
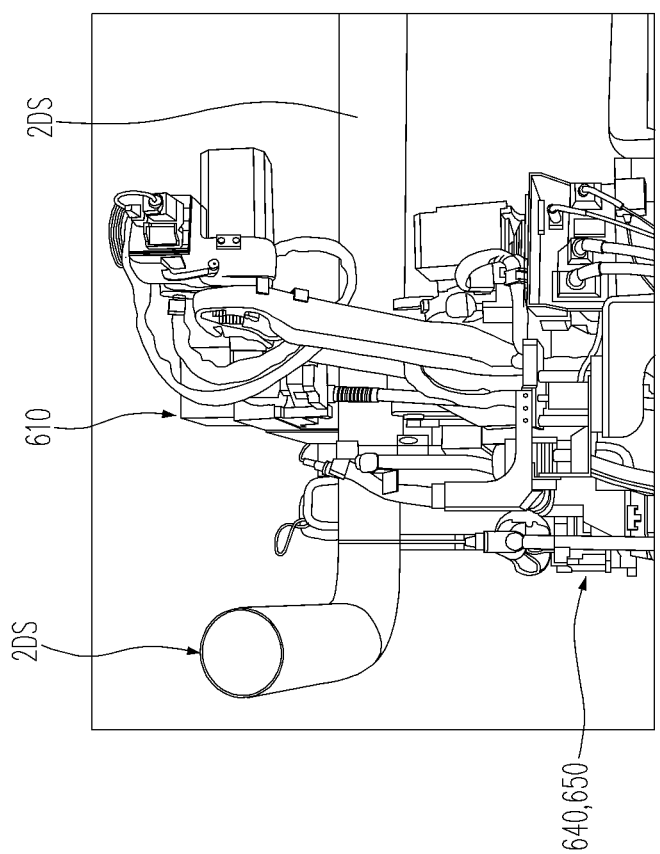
FIG. 21 is an image of an example in which the other root portion of a welding bevel between an end of a straight pipe spool and an end of another straight pipe spool or an end of the connection member is welded by a fill and cap welding robot of a straight pipe spool manufacturing unit of a system for automatically manufacturing a pipe spool according to an example embodiment of the present disclosure.

FIG. 20 is an image of an example in which a root portion of a welding bevel between an end of a straight pipe spool and an end of another straight pipe spool or an end of the connection member is welded by a root-welding robot of a straight pipe spool manufacturing unit of a system for automatically manufacturing a pipe spool according to an example embodiment. FIG. 21 is an image of an example in which the other root portion of a welding bevel between an end of a straight pipe spool and an end of another straight pipe spool or an end of the connection member is welded by a fill and cap welding robot of a straight pipe spool manufacturing unit of a system for automatically manufacturing a pipe spool according to an example embodiment.

Figure 22:
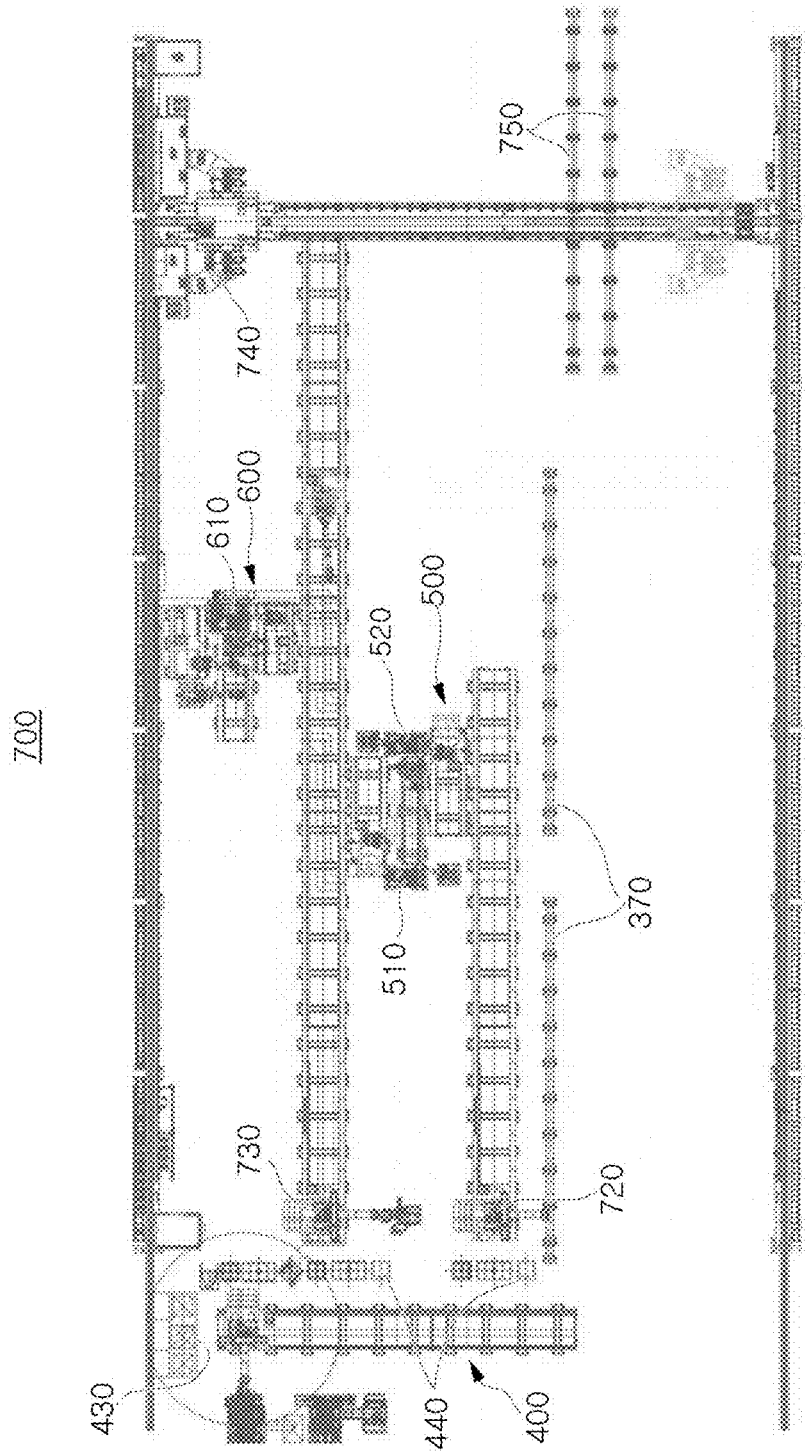
FIG. 22 is a diagram illustrating a handling unit of a system for automatically manufacturing a pipe spool according to an example embodiment of the present disclosure.

FIG. 22 is a diagram illustrating a handling unit of a system for automatically manufacturing a pipe spool according to an example embodiment.

Figure 23:
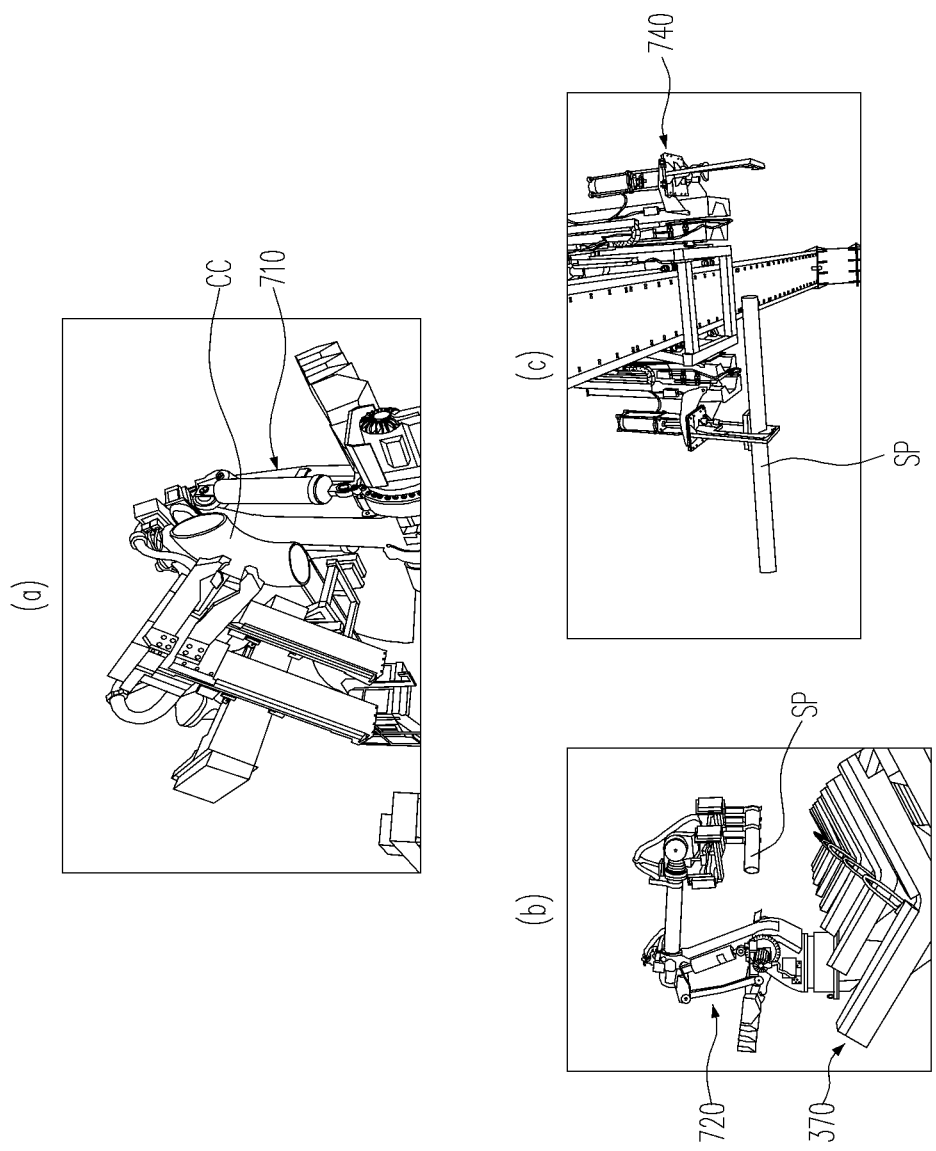
FIG. 23 is an image of an example of moving a connection member by a first handling robot of a handling unit of a system for automatically manufacturing a pipe spool, moving a spool pipe by a second handling robot, and moving a spool pipe by a gantry crane robot according to an example embodiment of the present disclosure.
Figure 24:
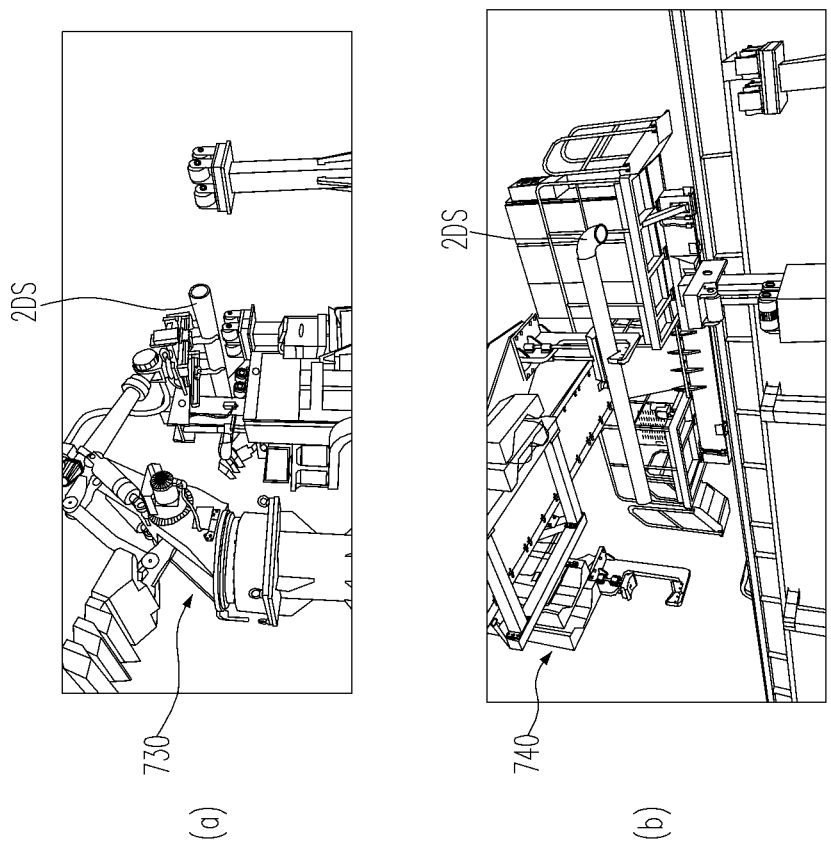
FIG. 24 is an image of an example of moving a straight pipe spool by a third handling robot or a gantry crane robot of a handling unit of a system for automatically manufacturing a pipe spool according to an example embodiment of the present disclosure.

FIG. 23 is an image of an example of moving a connection member by a first handling robot of a handling unit of a system for automatically manufacturing a pipe spool, moving a spool pipe by a second handling robot, and moving a spool pipe by a gantry crane robot according to an example embodiment. FIG. 24 is an image of an example of moving a straight pipe spool by a third handling robot or a gantry crane robot of a handling unit of a system for automatically manufacturing a pipe spool according to an example embodiment.

Figure 25:
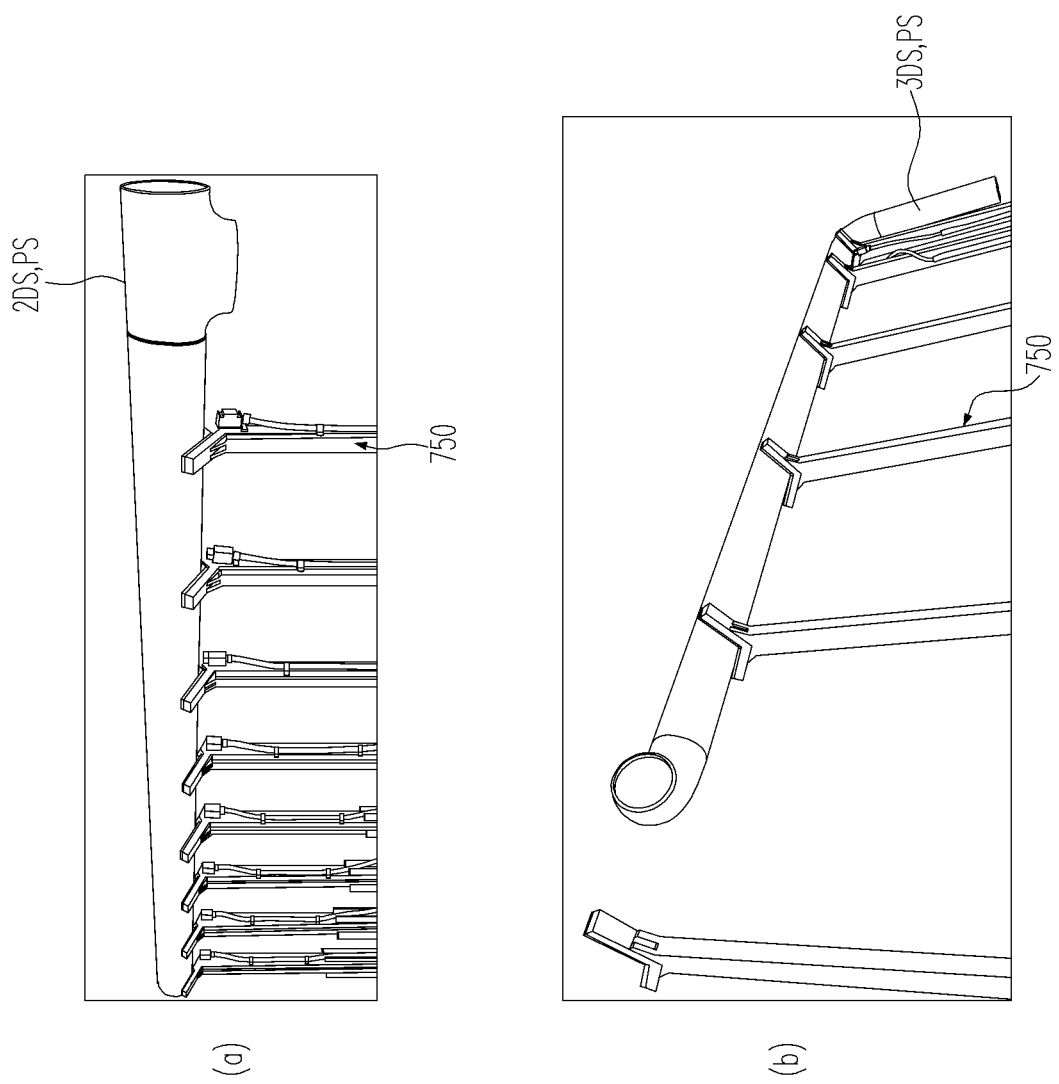
FIG. 25 is an image of an example in which a straight pipe spool or a three-dimensional spool is disposed as a pipe spool on a spool unloading unit of a handling unit of a system for automatically manufacturing a pipe spool according to an example embodiment of the present disclosure.
Figure 26:
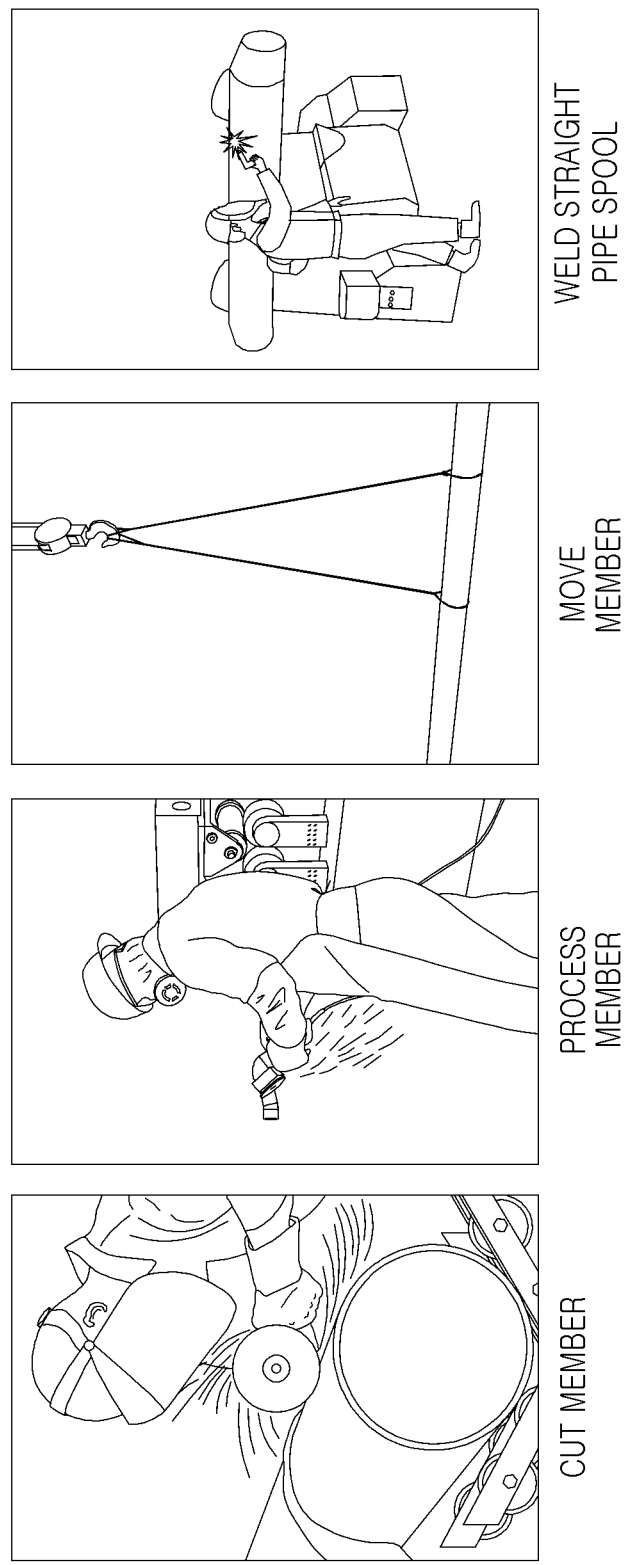
FIG. 26 is an image of an example of manufacturing a pipe spool by hand according to the prior art.

FIG. 25 is an image of an example in which a straight pipe spool or a three-dimensional spool is disposed as a pipe spool on a spool unloading unit of a handling unit of a system for automatically manufacturing a pipe spool according to an example embodiment.

An example embodiment of the system for automatically manufacturing a pipe spool according to an example embodiment may include a pipe cutting unit 200, a spool pipe bevel processing unit 300, a connection member bevel processing unit 400, a straight pipe spool manufacturing unit 500, a three-dimensional spool manufacturing unit 600, a handling unit 700, and a control unit 800, as illustrated in FIG. 1.

The pipe cutting unit 200 may include a pipe cutter 210 as illustrated in FIGS. 1 to 3. The pipe cutter 210 may manufacture the spool pipe SP by cutting the original pipe RP to a predetermined desired length. The configuration of the pipe cutter 210 is not limited to any particular example, and any configuration in which the spool pipe SP may be manufactured by cutting the original pipe RP to a predetermined desired length may be used.

To cut the original pipe RP with the pipe cutter 210, the pipe cutting unit 200 may further include a first cutting unit conveyor 220, a second cutting unit conveyor 230 and a pipe carriage 240 as illustrated in FIGS. 1 and 2. Also, the pipe cutting unit 200 may further include a first information marking device 250, which will be described later, and various sensors.

The first cutting unit conveyor 220 and the second cutting unit conveyor 230 may be provided on one side and the other side of the pipe cutter 210, respectively, as illustrated in FIGS. 1 and 2. Also, the pipe carriage 240 may be movably provided on the first cutting unit conveyor 220. For example, the pipe carriage 240 may include a moving driving unit (not illustrated) to allow the pipe carriage 240 to move in the first cutting unit conveyor 220, such that the pipe carriage 240 may be provided movably in the first cutting unit conveyor 220. However, the configuration in which the pipe carriage 240 is movably provided on the first cutting unit conveyor 220 is not limited to any particular example, and any well-known configuration may be used.

In this configuration, when the original pipe RP is placed on the portion of the first cutting unit conveyor 220 between the pipe cutter 210 and the pipe carriage 240 by a crane or a conveyor, for example, a length and thickness of the original pipe RP may be measured.

For example, the first cutting unit conveyor 220 may include an object sensor (not illustrated) for sensing that the original pipe RP is placed. In the object sensor, for example, a sensing rod (not illustrated) elastically supported by an elastic member (not illustrated) is raised to a predetermined height by elastic force of the elastic member, and when the sensing rod is pressed by the weight of the original pipe RP, an electrical signal may be generated while the sensing rod moves down. However, the object sensor is not limited to any particular example, and any well-known sensor which may sense an object may be used.

Also, the pipe carriage 240 may include an object sensor which may sense that the pipe carriage 240 moving from the first cutting unit conveyor 220 is in contact with one side of the original pipe PR disposed on the first cutting unit conveyor 220.

Also, the distance in which the pipe carriage 240 moves from the end of the first cutting unit conveyor 220 on the opposite side of the pipe cutter 210 may be recognized by a moving distance measuring sensor provided in the pipe carriage 240 (not illustrated), for example. Also, when the distance in which the pipe carriage 240 moves from the end of the first cutting unit conveyor 220 on the opposite side of the pipe cutter 210 is subtracted from the total length of the first cutting unit conveyor 220, the distance from the pipe cutter 210 to the pipe carriage 240 may be measured.

However, the method and configuration for measuring the distance from the pipe cutter 210 to the pipe carriage 240 are not limited to any particular example, and any well-known method and configuration may be used.

Also, the pipe carriage 240 may include a thickness measuring sensor (not illustrated) which may measure the thickness of the original pipe RP. The thickness measuring sensor may include, for example, movable inner and outer diameter contact bars (not illustrated), and the inner and outer diameter contact bars may be in contact with the inner and outer diameters of the original pipe RP, respectively, and the thickness of the original pipe RP may be measured. However, the thickness measuring sensor is not limited to any particular example, and any sensor which may measure the thickness of the original pipe RP may be used.

Also, an object sensor which may sense that the original pipe RP moves from the first cutting unit conveyor 220 by the pipe carriage 240 such that the other side of the original pipe RP reaches the pipe inlet side may be provided on the pipe inlet side of the pipe cutter 210.

In this configuration, when the original pipe RP is placed on the first cutting unit conveyor 220 is sensed by the object sensor of the first cutting unit conveyor 220, the pipe carriage 240 may be moved from the first cutting unit conveyor 220 by the moving driving unit and may be in contact with one side of the original pipe RP. When the pipe carriage 240 is in contact with one side of the original pipe RP placed on the first cutting unit conveyor 220 is sensed by the object sensor of the pipe carriage 240, the thickness of the original pipe RP may be measured by a thickness measuring sensor of the pipe carriage 240. When the thickness of the original pipe RP is measured, the pipe carriage 240 may move the original pipe RP to the pipe cutter 210. Also, when the other side of the original pipe RP reaches the pipe inlet of the pipe cutter 210 as the original pipe RP is moved by the pipe carriage 240, the object sensor of the pipe cutter 210 may sense the movement. Also, when the distance in which the pipe carriage 240 is moved from the end of the first cutting unit conveyor 220 on the opposite side of the pipe cutter 210 is subtracted from the total length of the first cutting unit conveyor 220, the distance from the pipe cutter 210 to the pipe carriage 240 may be measured, thereby measuring the length of the original pipe RP.

However, the configuration and method for measuring the length and thickness of the original pipe RP placed on the portion of the first cutting unit conveyor 220 between the pipe cutter 210 and the pipe carriage 240 is not limited to any particular example, and any well-known configuration and method may be used.

When the length and thickness of the original pipe RP are measured as above, the measured length and thickness of the original pipe RP may be transmitted to the control unit 800, and the control unit 800 may determine whether original pipe RP may be used to manufacture the desired pipe spool PS. For example, the control unit 800 may include a manufacturing execution system (MES; not illustrated), and the manufacturing execution system may receive the measured length and thickness of the original pipe RP, and may determine whether the original pipe RP may be used to manufacture the desired pipe spool PS.

When the control unit 800 determines that the original pipe RP is not able to be used to manufacture the desired pipe spool PS, the original pipe RP may pass through the pipe cutter 210 by the pipe carriage 240 and may be moved to the second cutting unit conveyor 230. The original pipe RP moved to the second cutting unit conveyor 230 may be moved to the end of the second cutting unit conveyor 230 on the opposite side of the pipe cutter 210 by the second cutting unit conveyor 230. The original pipe RP moved to the end of the second cutting unit conveyor 230 on the opposite side of the pipe cutter 210 may be discharged from the end of the second cutting unit conveyor 230, and may be moved to a material management site (not illustrated) by a moving means (not illustrated). The original pipe RP moved to the material management site may be managed by, for example, a material control system (MCS; not illustrated) included in the control unit 800 or configured separately and connected to the control unit 800.

When the control unit 800 determines that the original pipe RP is able to be used to manufacture the desired pipe spool PS, information on the pipe spool PS to be manufactured may be recorded in the portion of the original pipe RP to be manufactured as the pipe spool PS. That is, information on the pipe spool PS to be manufactured may be recorded in a portion of the original pipe RP which may be cut to a predetermined length with the pipe cutter 210 and may be manufactured as the spool pipe SP. Accordingly, an operator (not illustrated) may easily check information on the pipe spool PS using a mobile device. Also, in the subsequent process (not illustrated) of painting the pipe spool PS or the process (not illustrated) of inspecting the pipe spool PS, the painting or inspecting of the pipe spool PS may be easily performed using the information on the pipe spool PS. Also, in the material management system or the spool control system (SCS; not illustrated) having a database, included in the control unit 800, or provided separately and connected to the control unit 800, the information of the pipe spool PS may be easily used for material management or spool management. Accordingly, the pipe spool may be manufactured without a surge.

For example, a first information marking device 250 may be provided integrally with or separately from the pipe cutter 210 on the pipe inlet side of the pipe cutter 210 as illustrated in FIG. 2. The first information marking device 250 may record information on the pipe spool PS to be manufactured, in the portion of the original pipe RP to be manufactured as the pipe spool PS. The first information marking device 250 may record information on the pipe spool PS to be manufactured in the portion of the original pipe RP to be manufactured as the pipe spool PS in the form of a quick response (QR) code. The QR code may include the specification of spool pipe SP (a material, a length, a thickness and a weight), a heat number (the country of origin represented in numbers), a spool number (the position of the spool pipe SP in the pipe spool PS to be manufactured, the line of piping equipment including the pipe spool PS to be manufactured, the number of spool pipes SP included in the pipe spool PS to be manufactured, represented in numbers), a production history, and drawing information. By the QR code, the operator may easily check the information on the pipe spool PS with a mobile device as described above. Also, in the subsequent process of painting the pipe spool PS or the process of inspecting the pipe spool PS, painting or inspection of the pipe spool PS may be performed by easily using the information on the pipe spool PS. Also, the MCS or the SCS included in the control unit 800 or configured separately and connected to the control unit 800 may easily use the information on the pipe spool PS for material management or spool management.

However, the format, method, or configuration in which information on the pipe spool PS to be manufactured is recorded in the portion of the original pipe RP, which will become the pipe spool PS, is not limited to any particular example, and any well-known format, method or configuration may be used.

When information on the pipe spool PS to be manufactured is recorded on the portion of the original pipe RP to become the pipe spool PS, the pipe carriage 240 may move the original pipe RP to pass through the pipe cutter 210 by a predetermined desired length. Accordingly, as illustrated in FIG. 3, the other side of the original pipe RP may be disposed on the second cutting unit conveyor 230, and one side of the original pipe RP may be disposed on the first cutting unit conveyor 220. In this case, the second cutting unit conveyor 230 may also include an object sensor and may sense that the other side of the original pipe RP may be disposed on the second cutting unit conveyor 230. In this state, as the pipe cutter 210 cuts the original pipe RP, the spool pipe SP having a predetermined desired length may be manufactured. The spool pipe SP manufactured as above may be moved to the spool pipe bevel processing unit 300 by a kicker (not illustrated) provided in the second cutting unit conveyor 230.

The residual pipe (not illustrated) which is not manufactured as the spool pipe SP and a remaining portion of the original pipe RP may have a sufficient length to manufacture another spool pipe SP. In this case, the series of processes including recording of information on the pipe spool PS to be manufactured by the first information marking device 250, allowing the portion of the residual pipe to pass through the pipe cutter 210 by the pipe carriage 240, and cutting the residual pipe with the pipe cutter 210 may be repeatedly performed. Accordingly, since a plurality of spool pipes SP may be manufactured with a single original pipe RP, as many pipe spools PS as possible may be manufactured with one original pipe RP.

Also, the residual pipe (not illustrated) which is not manufactured as the spool pipe SP and a remaining portion of the original pipe RP may not have a sufficient length to manufacture another spool pipe SP. In this case, the residual pipe, which is the remaining portion of the original pipe RP, may pass through the pipe cutter 210 by the pipe carriage 240 and may be moved to the second cutting unit conveyor 230. The residual pipe moved to the second cutting unit conveyor 230 may be moved to the end of the second cutting unit conveyor 230 on the opposite side of the pipe cutter 210 by the second cutting unit conveyor 230. The residual pipe moved to the end of the second cutting unit conveyor 230 on the opposite side of the pipe cutter 210 may be discharged from the end of the second cutting unit conveyor 230 to a material management site by a moving means. The residual pipe moved to the material management site may be managed by a MCS included in the control unit 800 or configured separately and connected to the control unit 800, for example.

Information on the length and thickness of the residual pipe moved to the material management site may be recorded separately in a MES of the control unit 800, a current status of the entire residual pipe and whether to reuse the residual pipe later may be managed. Also, by recording a QR code on the residual pipe through the above-described first information marking device 250, for example, and the residual pipe may be managed through the MCS.

This series of processes in the pipe cutting unit 200 may be controlled by the control unit 800 connected to each of the above-described components included in the pipe cutting unit 200.

The spool pipe bevel processing unit 300 may include spool pipe bevel processing devices 310 and 320 as illustrated in FIGS. 1 and 4. The spool pipe bevel processing device 310 and 320 may form a welding bevel WG at the end of the spool pipe SP.

Also, the spool pipe bevel processing device 310 and 320 may further process the inner and outer diameters of the end of the spool pipe SP in which the welding bevel WG is formed. Accordingly, an additional processing surface AF may be further formed at the end of the spool pipe SP in addition to the welding bevel WG as illustrated in (b) of FIG. 5. Accordingly, the welding of the welding bevel WG between the end of the spool pipe SP and the end of the connection member CC by welding robots 530, 540, 550, and 560 to be described later included in the straight pipe spool manufacturing unit 500 may be easily performed. Also, the welding of the welding bevel WG between the end of the straight pipe spool 2DS and the end of the other straight pipe spool 2DS or the end of the connection member CC by the welding robots 620, 630, 640, and 650 to be described later included in the three-dimensional spool manufacturing unit 600 may be easily performed.

The configuration of the spool pipe bevel processing device 310 and 320 is not limited to any particular example, and any well-known device which may process a welding bevel WG at the end of the spool pipe SP, may further process the inner and outer diameters of the end of the spool pipe SP in which the welding bevel WG is formed to further form the additional processing surface AF at the end of the spool pipe SP may be used.

The welding bevel WG formed in the end of the spool pipe SP by the spool pipe bevel processing device 310 and 320 may be, for example, a J-shaped welding bevel WG necessary for auto-robot welding (ARW) as illustrated in (b) of FIG. 5 or a V-shaped welding bevel WG necessary for manual welding. In this case, the J-shaped welding bevel WG or the V-shaped welding bevel WG may be formed both ends of the spool pipe SP, or the J-shaped welding bevel WG may be formed on one end and the V-shaped welding bevel WG may be formed on the other end.

When the J-shaped welding bevel WG is formed in the spool pipe SP, a circular surface CF may be formed on the end of the spool pipe SP as illustrated in (b) of FIG. 5. Also, the J-shaped welding bevel WG may be formed by the connection member bevel processing devices 410 and 420 included in the connection member bevel processing unit 400 may be formed in the end of the connection member CC welded to the spool pipe SP, such that the circular surface CF may be formed on the end of the connection member CC as well, as illustrated in (b) of FIG. 5.

Therefore, as illustrated in (c) of FIG. 5, by matching the circular surface CF of the end of the spool pipe SP and the circular surface CF of the end of the connection member CC, the bevel surfaces may be fit up. Accordingly, as illustrated in FIGS. 10 to 12, in a state in which the spool pipe SP is gripped by the straight pipe spool welding sites 510 and 520 included in the straight pipe spool manufacturing unit 500, the bevel surfaces of the end of the spool pipe SP and the end of the connection member CC may be fit up by the first gap sensing robot 570 included in the straight pipe spool manufacturing unit 500 and the second handling robot 720 included in the handling unit 700. Also, as illustrated in FIGS. 17 to 19, in the state in which the straight pipe spool 2DS is gripped by the three-dimensional spool welding site 610 included in the three-dimensional spool manufacturing unit 600, the bevel surfaces of the end of the straight pipe spool 2DS and the end of the other straight pipe spool 2DS or the end of the connection member CC may be fit up by the second gap sensing robot 660 included in the three-dimensional spool manufacturing unit 600 and the third handling robot 730 included in the handling unit 700.

Also, as illustrated in (c) of FIG. 5, by allowing the circular surface CF of the end of the spool pipe SP and the circular surface CF of the end of the connection member CC to be in contact with each other, no gap may be formed between the circular surface CF of the end of the spool pipe SP and the circular surface CF of the end of the connection member CC. Also, by allowing the circular surface CF of the end of the straight pipe spool 2DS to be in contact with the circular surfaces CF of the end of the other straight pipe spool 2DS or the end of the connection member CC, no gap may be formed between the circular surface CF of the end of the straight pipe spool 2DS and the circular surfaces CF of the end of the other straight pipe spool 2DS or the end of the connection member CC.

Accordingly, during welding of the welding bevel WG between the end of the spool pipe SP and the end of the connection member CC, as illustrated in (c) of FIG. 5, a back bead may be formed. Also, during welding of the welding bevel WG between the end of the straight pipe spool 2DS and the end of the other straight pipe spool 2DS or the end of the connection member CC, as illustrated in (c) of FIG. 5, a back bead may be formed.

Accordingly, root-welding of the welding bevel WG between the end of the spool pipe SP and the end of the connection member CC by the root-welding robot 530 and 540 included in the straight pipe spool manufacturing unit 500 may be performed. Also, root-welding of the welding bevel WG between end of the straight pipe spool 2DS and the end of the other straight pipe spool 2DS or the end of the connection member CC by the root-welding robots 620 and 630 included in the three-dimensional spool manufacturing unit 600 may be performed.

However, the shape of the welding bevel WG formed in the end of the spool pipe SP by the spool pipe bevel processing devices 310 and 320 is not limited to any particular example, and any well-known shape of the welding bevel WG may be formed.

The spool pipe bevel processing device 310 and 320 may include a vision sensor VS as illustrated in FIGS. 1 and 4. The vision sensor VS of the spool pipe bevel processing devices 310 and 320 may measure the shape, circularity, thickness, and center of the end of the spool pipe SP. Accordingly, it may be determined whether the processing of the welding bevel WG at the end of the spool pipe SP is possible by the spool pipe bevel processing device 310 and 320. For example, whether circularity of a predetermined thickness may be formed at the end of the spool pipe SP as marked with a thick line in (a) of FIG. 5 may be measured, and it may be determined whether the additional processing surface AF may be formed at the end of the spool pipe SP along with forming the circular surface CF by forming the J-shaped welding bevel WG. Also, the center of the spool pipe bevel processing device 310 and 320 may be adjusted to match the center of the end of the spool pipe SP through the shape, circularity, thickness and, center of the end of the spool pipe SP measured by the vision sensor VS of the spool pipe bevel processing device 310 and 320. Accordingly, the spool pipe bevel processing devices 310 and 320 may more effectively process the welding bevel WG at the end of the spool pipe SP.

As a result of the measurement by the vision sensor VS of the spool pipe bevel processing device 310 and 320, the spool pipe SP in which the processing of the welding bevel WG by the spool pipe bevel processing device 310 and 320 is impossible may be moved to the spool pipe lift 360 and may be moved to the spool unloading unit 750 included in the handling unit 700 through the gantry crane robot 740 of the handling unit 700. The spool pipe SP, which has been moved to the spool unloading unit 750, and in which the welding of the welding bevel WG by the spool pipe bevel processing devices 310 and 320 is not possible, may be discharged from the spool unloading unit 750 and may be moved to a material management site by a moving means. The spool pipe SP, which has been moved to the material management site, and in which processing of the welding bevel WG by the spool pipe bevel processing devices 310 and 320 is not possible, may be managed by the MCS included in the control unit 800 or configured separately and connected to the control unit 800.

The spool pipe bevel processing unit 300 may include a spool pipe standby unit 370 as illustrated in FIGS. 1 and 4. A spool pipe SP having a welding bevel WG formed at an end of the spool pipe standby unit 370 may be placed on standby. The spool pipe standby unit 370 may include an object sensor, and may be sensed that the spool pipe SP is placed on the spool pipe standby unit 370. The spool pipe SP placed on the spool pipe standby unit 370 and waiting therein may be moved to the straight pipe spool welding site 510 and 520 of the straight pipe spool manufacturing unit 500 through the second handling robot 720 or the gantry crane robot 740 of the handling unit 700. The spool pipe SP placed on the spool pipe standby unit 370 and waiting therein may be moved to the three-dimensional spool welding site 610 of the three-dimensional spool manufacturing unit 600 through the gantry crane robot 740 of the handling unit 700.

The spool pipe bevel processing device 310 and 320 may include, for example, a first spool pipe bevel processing device 310 and a second spool pipe bevel processing device 320, as illustrated in FIGS. 1 and 4. The first spool pipe bevel processing device 310 may form a welding bevel WG at one end of the spool pipe SP. Also, the first spool pipe bevel processing device 310 may further process the inner and outer diameters of one end of the spool pipe SP on which the welding bevel WG is formed. The second spool pipe bevel processing device 320 may form a welding bevel WG at the other end of the spool pipe SP. Also, the second spool pipe bevel processing device 320 may further process the inner and outer diameters of the other end of the spool pipe SP on which the welding bevel WG is formed. However, the number of the spool pipe bevel processing devices 310 and 320 is not limited to any particular example, and any number of the devices may be possible.

The spool pipe bevel processing unit 300 may further include bevel processing unit conveyors 330 and 340, spool pipe moving devices 351, 352, and 353, and a spool pipe lift 360, as illustrated in FIGS. 1 and 4.

The bevel processing unit conveyor 330 and 340 may be provided in front of the spool pipe bevel processing device 310 and 320, and the spool pipe SP may be placed as illustrated in FIG. 6. The bevel processing unit conveyors 330 and 340 may be provided with an object sensor, and may sense that the spool pipe SP may be placed on the bevel processing unit conveyors 330 and 340.

The spool pipe SP placed on the bevel processing unit conveyors 330 and 340 may be moved back and forth around the spool pipe bevel processing unit 310 and 320 by the bevel processing unit conveyors 330 and 340. Accordingly, when the spool pipe SP is placed on the processing unit conveyors 330 and 340, the spool pipe SP may be moved to the spool pipe processing device 310 and 320. In this state, the shape, circularity, thickness, and center of the end of the spool pipe SP may be measured by the vision sensor VS of the spool pipe bevel processing devices 310 and 320. Also, according to the measurement result of the vision sensor VS of the spool pipe bevel processing device 310 and 320, the center of the spool pipe bevel processing device 310 and 320 and the center of the end of the spool pipe SP may be fit up. For example, the centers of the spool pipe bevel processing devices 310 and 320 and the center of the end of the spool pipe SP may be fit up by the movement of the spool pipe SP in the height direction by the bevel processing unit conveyors 330 and 340 and the movement of a tool (not illustrated) included in the spool pipe bevel processing devices 310 and 320.

As illustrated in FIG. 6, in the state in which the spool pipe SP is supported by the bevel processing unit conveyors 330 and 340, the welding bevel WG may be formed in the end of the spool pipe SP by the spool pipe bevel processing devices 310 and 320. Also, in a state in which the spool pipe SP is supported by the bevel processing unit conveyors 330 and 340, the inner and outer diameters of the ends of the spool pipe SP in which the welding bevel WG is formed may be further processed by the spool pipe bevel processing devices 310 and 320, and an additional processing surface AF may be formed at the end of the spool pipe SP.

The spool pipe SP having a welding bevel WG and an additional processing surface AF formed at the end by the spool pipe bevel processing device 310 and 320 may be retracted from the spool pipe bevel processing device 310 and 320 in the bevel processing unit conveyors 330 and 340. The bevel processing unit conveyors 330 and 340 may include kickers. Also, the spool pipe SP at the end of which welding bevel WG and the additional processing surface AF are formed and retracted from the spool pipe bevel processing devices 310 and 320 may be moved to the spool pipe moving device 351, 352, and 353 by a kicker of the bevel processing unit conveyors 330 and 340

When the spool pipe processing devices 310 and 320 include the first spool pipe processing device 310 and the second spool pipe processing device 320, the bevel processing unit conveyors 330 and 340 may include the first bevel processing unit conveyor 330 provided in front of the first spool pipe bevel processing device 310 and a second bevel processing unit conveyor 340 provided in front of the second spool pipe bevel processing device 320.

The spool pipe moving devices 351, 352, and 353 may move the spool pipe SP from the pipe cutting unit 200 to the bevel processing unit conveyors 330 and 340, from the bevel processing unit conveyors 330 and 340 to the spool pipe lift 360, or from one of the bevel processing unit conveyors 330 and 340 to another one of the bevel processing unit conveyors 330 and 340.

When the spool pipe bevel processing device 310 and 320 include the first spool pipe bevel processing device 310 and the second spool pipe bevel processing device 320, and the bevel processing unit conveyors 330 and 340 include the first bevel processing unit conveyor 330 and the second bevel processing unit conveyor 340, the spool pipe moving devices 351, 352, and 353 may include the first, second, and third spool pipe moving devices 351, 352, and 353 as illustrated in FIGS. 1 and 4. Also, the first spool pipe moving device 351 is provided between the second cutting unit conveyor 230 of the pipe cutting unit 200 and the first bevel processing unit conveyor 330, and the spool pipe SP moved from the second cutting unit conveyor 230 of the pipe cutting unit 200 may be moved to the first bevel processing unit conveyor 330. Also, the second spool pipe moving device 352 may be provided between the first bevel processing unit conveyor 330 and the second bevel processing unit conveyor 340, and may move the spool pipe SP moved from the first bevel processing unit conveyor 330 to the second bevel processing unit conveyor 340. Also, the third spool pipe moving device 353 may be provided between the second bevel processing unit conveyor 340 and the spool pipe lift 360, and may move the spool pipe SP moved from the second bevel processing unit conveyor 340 to the spool pipe lift 360.

However, the number of spool pipe moving devices 351, 352, and 353 is not limited to any particular example, and any number of the device to move the spool pipe SP form the pipe cutting unit 200 to the bevel processing unit conveyors 330 and 340 or from one of the bevel processing unit conveyors 330 and 340 to the other one of the bevel processing unit conveyors 330 and 340 may be provided. Also, the configuration of the spool pipe moving devices 351, 352, and 353 is limited to any particular example, and any configuration in which the spool pipe SP may be moved may be used.

The spool pipe lift 360 may be provided between the spool pipe moving device 351, 352, and 353, that is, for example, the third spool pipe moving device 353 of the spool pipe moving device 351, 352, and 353 and the spool pipe standby unit 370 as illustrated in FIGS. 1 and 4. The spool pipe lift 360 may include an object sensor such that the spool pipe SP placed on the spool pipe lift 360 may be sensed.

The spool pipe lift 360 may be, for example, a scissor lift. In this case, the spool pipe lift 360, which is a scissor lift, may adjust the level of the spool pipe SP placed thereon and may move the position thereof. Accordingly, the second handling robot 720 or the gantry crane robot 740 of the handling unit 700 may easily access the spool pipe SP placed on the spool pipe lift 360 and may move the spool pipe SP. However, the spool pipe lift 360 is not limited to any particular example, and any device on which the spool pipe SP is disposed, and to which the second handling robot 720 or the gantry crane robot 740 of the handling unit 700 easily approaches, and which may move the spool pipe SP may be used.

In this configuration, the spool pipe SP may be moved to the spool pipe moving device 351 between the second cutting unit conveyor 230 and the first bevel processing unit conveyor 330 by the kicker of the second cutting unit conveyor 230 of the pipe cutting unit 200.

Also, the spool pipe SP may be moved to the first bevel processing unit conveyor 330 by the first spool pipe moving device 351. A J-shaped or V-shaped welding bevel WG may be formed on the end of the spool pipe SP in the first bevel processing unit conveyor 330 by the first spool pipe bevel processing device 310, for example. Also, inner and outer diameters of one end of the spool pipe SP may be processed by the first spool pipe bevel processing device 310 and an additional processing surface AF may be formed.

The spool pipe SP having a welded line WG formed at one end thereof may be moved to the second spool pipe moving device 352 between the first bevel processing unit conveyor 330 and the second bevel processing unit conveyor 340 by the kicker of the first bevel processing unit conveyor 330, and may be moved to the second bevel processing unit conveyor 340 by the second spool pipe moving device 352. In the second bevel processing unit conveyor 340, a J-shaped or V-shaped welding bevel WG may be formed at the other end of the spool pipe SP by the second spool pipe processing device 320. In this case, the inner and outer diameters of the other end of the spool pipe SP may be processed by the second spool pipe bevel processing device 320 and an additional processing surface AF may be formed.

The spool pipe SP in which the welding bevel WG is formed at the other end thereof may be moved to the third spool pipe moving device 353 disposed between the second bevel processing unit conveyor 340 and the spool pipe lift 360 by the kicker of the second bevel processing unit conveyor 340. The spool pipe SP which does not need the welding bevel WG on the other end thereof may not include the welding bevel WG or the additional processing surface AF on the other end thereof by the second spool pipe bevel processing device 320 in the second bevel processing unit conveyor 340, and may be moved to the third spool pipe moving device 353 by the kicker of the second bevel processing unit conveyor 340. The spool pipe SP moved to the third spool pipe moving device 353 may be moved to the spool pipe lift 360 by the third spool pipe moving device 353.

The spool pipe SP moved to the spool pipe lift 360 may be moved to the spool pipe standby unit 370 by the second handling robot 720 or the gantry crane robot 740 of the handling unit 700 or may be moved to the first straight pipe spool welding site 510 or the second straight pipe spool welding site 520 of the straight pipe spool manufacturing unit 500. The spool pipe SP moved to the spool pipe lift 360 may be moved to the three-dimensional spool welding site 610 of the three-dimensional spool manufacturing unit 600 by the gantry crane robot 740 of the handling unit 700.

A series of processes in the spool pipe bevel processing unit 300 may be controlled by the control unit 800 connected to each of the above-described components included in the spool pipe bevel processing unit 300.

The connection member bevel processing unit 400 may include connection member bevel processing device 410 and 420 as illustrated in FIGS. 1 and 7. The connection member bevel processing devices 410 and 420 may form a welding bevel WG at the end of the connection member CC to be connected to the spool pipe SP by welding. The connection member CC may be connected to the straight pipe spool 2DS, which may be formed by welding the connection member CC to the spool pipe SP, by welding.

The connection member bevel processing device 410 and 420 may further process the inner and outer diameter of the end of the connection member CC in which the welding bevel WG is formed. Accordingly, an additional processing surface AF may be further formed at the end of the connection member CC in addition to the welding bevel WG as illustrated in 5(b) of FIG. 5. Accordingly, the welding of the welding bevel WG between the end of the spool pipe SP and the end of the connection member CC may be easily performed by the welding robots 530, 540, 550, and 560 of the straight pipe spool manufacturing unit 500. Also, the welding of the welding bevel WG between the end of the straight pipe spool 2DS and the end of the other straight pipe spool 2DS or the end of the connection member CC may be easily performed by the welding robot 620, 630, 640, and 650 of the three-dimensional spool manufacturing unit 600.

The configuration of the connection member bevel processing devices 410 and 420 is not limited to any particular example, and any configuration in which the welding bevel WG may be formed in the end of the connection member CC, and the additional processing surface AF may be formed at the end of the connection member CC by further processing the inner and outer diameters of the ends of the connection member CC in which the welding bevel WG is formed may be used.

The connection member CC may be, for example, a fitting member, such as an elbow, a reducer or a tee, or a flange member. However, the connection member CC is not limited to any particular example, and any member which may be connected to the spool pipe SP or the straight pipe spool 2DS by welding may be used.

The welding bevel WG formed in the end of the connection member CC such as a fitting member or a flange member by the connection member bevel processing device 410 and 420 may be, for example, a J-shaped welding bevel WG. Since the connection member CC, such as a fitting member or a flange member, is generally supplied with a V-shaped welding bevel WG formed in the end thereof, in this case, it may not be necessary to form the V-shaped welding bevel WG at the end of the connection member CC such as a fitting member or a flange member by the connection member bevel processing devices 410 and 420. However, in the case in which the V-shaped welding bevel WG is formed in the end of the connection member CC and not supplied, a V-shaped welding bevel WG may be formed in the end of the connection member CC by the connection member bevel processing devices 410 and 420.

When a J-shaped welding bevel WG is formed in the end of the connection member CC such as a fitting member or a flange member, a circular surface CF may be formed at the end of the connection member CC, as illustrated in (b) of FIG. 5. Accordingly, as illustrated in (c) of FIG. 5, by matching the circular surface CF of the end of the spool pipe SP and the circular surface CF of the end of the connection member CC, the bevel surfaces may be fit up. Accordingly, in the state in which the spool pipe SP is gripped by the straight pipe spool welding sites 510 and 520 of the straight pipe spool manufacturing unit 500 as illustrated in FIGS. 10 to 12, the bevel surfaces of the end of the spool pipe SP and the end of the connection member CC may be fit up by the gap sensing robot 570 of the straight pipe spool manufacturing unit 500 and the second handling robot 720 of the handling unit 700. Also, as illustrated in FIGS. 17 to 19, in a state in which the straight pipe spool 2DS is gripped by the three-dimensional spool welding site 610 of the three-dimensional spool manufacturing unit 600, the bevel surfaces of the end of straight pipe spool 2DS and the end of the other straight pipe spool 2DS or the end of the connection member CC may be fit up by the sensing robot 660 of the three-dimensional spool manufacturing unit 600 and the third handling robot 730 of the handling unit 700.

As illustrated in (c) of FIG. 5, by allowing the circular surface CF of the end of the spool pipe SP to be in contact with the circular surface CF of the end of the connection member CC, no gap may be formed between the circular surface CF of the end of the spool pipe SP and the circular surface CF of the end of the connection member CC. Also, by allowing the circular surface CF of the end of the straight pipe spool 2DS to be in contact with the circular surface CF of the end of the other straight pipe spool 2DS or the end of the connection member CC, no gap may be formed between the circular surface CF of the end of the straight pipe spool 2DS and the circular surface CF of the end of the other straight pipe spool 2DS or the end of the connection member CC.

Accordingly, during welding of the welding bevel WG between the end of the spool pipe SP and the end of the connection member CC, as illustrated in (c) of FIG. 5, a back bead may be formed. Also, during welding the welding bevel WG between the end of the straight pipe spool 2DS and the end of the other straight pipe spool 2DS or the end of the connection member CC, as illustrated in (c) of FIG. 5, a back bead may be formed.

Accordingly, the root-welding of the welding bevel WG between the end of the spool pipe SP and the end of the connection member CC by the root-welding robot 530 and 540 of the straight pipe spool manufacturing unit 500 may be performed. Also, the root-welding of the welding bevel WG between the end of the straight pipe spool 2DS and the end of the other straight pipe spool 2DS or the end of the connection member CC by the root-welding robots 620 and 630 of the three-dimensional spool manufacturing unit 600 may be performed.

However, the shape of the welding bevel WG formed in the end of the connection member CC by the connection member bevel processing devices 410 and 420 is not limited to any particular example, and any well-known shape of the welding bevel WG may be used.

A plurality of the connection member bevel processing devices 410 and 420 may be provided. For example, the connection member bevel processing devices 410 and 420 may include a first connection member bevel processing device 410 and a second connection member bevel processing device 420 as illustrated in FIGS. 1 and 7.

The first connection member bevel processing device 410 may form, for example, a J-shaped welding bevel WG at one or both ends of a fitting member such as an elbow or a reducer or a tee of the connection member CC. The J-shaped welding bevel WG formed in the end of the fitting member, which is the connection member CC, by the first connection member bevel processing device 410 may form the same circular surface CF as the circular surface CF formed by the J-shaped welding bevel WG formed in the end of the spool pipe SP included in the pipe spool PS together with the fitting member, the connection member CC. Also, the first connection member bevel processing device 410 may further process the inner and outer diameters of the end of the fitting member, which is the connection member CC, to match the thickness with the spool pipe SP and may further form the additional processing surface AF on the fitting member, the connection member CC.

The first connection member bevel processing device 410 may include a vision sensor VS as illustrated in FIGS. 1 and 7, and may measure the shape, circularity, thickness and, the center of the fitting member, the connection member CC. Through this, it may be determined whether the processing of the welding bevel WG may be performed on the end of the fitting member, the connection member CC by the first connection member bevel processing device 410. For example, as marked with a thick line in (a) of FIG. 5, whether a roundness of a predetermined thickness may be formed at the end of the fitting member, the connection member CC, may be measured, and it may be determined whether the circular surface CF may be formed at the end of the fitting member, the connection member CC, by forming the J-shaped welding bevel WG and the additional processing surface AF may be formed. Also, the center of the first connection member bevel processing device 410 and the center of the end of the fitting member, the connection member CC, may be adjusted to match through the shape, circularity, thickness, and center of the end portion of the fitting member, which is the connection member CC, measured by the vision sensor VS of the first connection member bevel processing device 410. Accordingly, the first connection member bevel processing device 410 may more effectively process the welding bevel WG at the end of the fitting member, the connection member CC.

According to the measurement result of the vision sensor VS of the first connection member bevel processing device 410, the fitting member, the connection member CC, in which the processing of the welding bevel WG by the first connection member bevel processing device 410 is impossible, may be moved to the first connection member standby unit 430 by the first handling robot 710 included in the handling unit 700. The fitting member, the connection member CC, in which the processing of the welding bevel WG by the first connection member bevel processing device 410 is impossible and moved to the first connection member standby unit 430 may be discharged from the first connection member standby unit 430 and may be moved to a material management site by a moving means. The fitting member, the connection member CC, in which the processing of the welding bevel WG by the first connection member bevel processing device 410 is impossible and moved to the material management site, may be managed by the MCS included in the control unit 800 or configured separately and connected to the control unit 800.

The second connection member bevel processing device 420 may form a welding bevel WG, for example, a J-shaped welding bevel WG at one or both ends of the flange member of the connection member CC. The J-shaped welding bevel WG formed in the end of the flange member, which is the connection member CC, by the second connection member bevel processing device 420 may form the same circular surface CF as the circular surface CF formed by the J-shaped welding bevel WG formed in the end of the spool pipe SP included in the pipe spool PS together with the flange member, the connection member CC. Also, the second connection member bevel processing device 420 may further process the inner and outer diameters of the end of the flange member, which is the connection member CC, to match the thickness with the spool pipe SP and may further form an additional processing surface AF on the flange member, the connection member CC.

Since the shape of the end of the flange member, which is the connection member CC, is relatively uniform, the second connection member bevel processing device 420 may not be provided with a vision sensor VS as illustrated in FIGS. 1 and 7. In this case, the center of the second connection member bevel processing device 420 and the center of the end of the flange member which is the connection member CC may be adjusted to match by the clamp CL as illustrated in FIG. 8, provided in the second connection member bevel processing device 420.

The connection member bevel processing unit 400 may further include a first connection member standby unit 430 and a second connection member standby unit 440 as illustrated in FIGS. 1 and 7.

The first connection member standby unit 430 may be disposed on the connection member CC such as a fitting member or a flange member before welding bevel WG processing and may stand by therein. The first connection member standby unit 430 may include an object sensor, and may sense that the connection member CC is placed in the first connection member standby unit 430.

The fitting member of the connection member CC before welding bevel WG processing may be moved from the first connection member standby unit 430 to the first connection member bevel processing device 410 by the first handling robot 710 of the handling unit 700. Also, the flange member of the connection member CC before welding bevel WG processing may be moved from the first connection member standby unit 430 to the second connection member bevel processing device 420 by the first handling robot 710 of the handling unit 700. The fitting member and the flange member, which have been moved to the first and second connection member bevel processing devices 410 and 420, respectively, may include the welding bevels WG formed in the ends thereof by the first and second connection member bevel processing devices 410 and 420, respectively, and the inner and outer diameters may be processed. In this case, the fitting member of the connection member CC may be processed by the first connection member bevel processing device 410 while being gripped by the first handling robot 710 of the handling unit 700.

A second information marking device 450 may be provided between the first connection member standby unit 430 and the second connection member standby unit 440 as illustrated in FIG. 7. Also, while the fitting member and the flange member, the connection members CC, is moved to the first and second connection member bevel processing devices 410 and 420, respectively, by the first handling robot 710 of the handling unit 700, the information on the pipe spool PS to be manufactured by the fitting member and the flange member may be recorded in the form of a QR code in each of the fitting member and the flange member by the second information marking device 450.

The connection member CC, such as a fitting member or a flange member, in which the processing of the welding bevel WG at the end by the first and second connection member bevel processing devices 410 and 420 is not possible, may be moved to the first connection member standby unit 430 by the first handling robot 710. The connection member CC, such as a fitting member or a flange member, in which the processing of the welding bevel WG at the end by the first and second connection member bevel processing devices 410 and 420 is not possible and moved to the first connection member standby unit 430 may be discharged from the first connection member standby unit 430 and may be moved to a material management site by a moving means. The connection member CC, such as a fitting member or a flange member, in which the processing of the welding bevel WG at the end by the first and second connection member bevel processing devices 410 and 420 is not possible and moved to the material management site may be managed by the MCS included in the control unit 800 or configured separately and connected to the control unit 800.

The connection member CC of which the welding bevel WG is formed in the end and the inner and outer diameters are processed may be disposed on the second connection member standby unit 440 and may stand by therein. The second connection member standby unit 440 may include an object sensor, and may sense that the connection member CC is placed in the second connection member standby unit 440.

The connection member CC such as the fitting member and the flange member in which the welding bevel WG is formed and the inner and outer diameters are processed in the first and second connection member bevel processing devices 410 and 420 may be moved from the first and second connection member bevel processing devices 410 and 420 to the second connection member standby unit 440.

The connection member CC, such as a fitting member or a flange member standby in the second connection member standby unit 440 may be moved to the straight pipe spool welding site 510 and 520 of the straight pipe spool manufacturing unit 500 by the second handling robot 720 of the handling unit 700, or may be moved to the three-dimensional spool welding site 610 of the three-dimensional spool manufacturing unit 600 by the third handling robot 730 of the handling unit 700.

A series of processes in the connection member bevel processing unit 400 may be controlled by the control unit 800 connected to each of the above-described components included in the connection member bevel processing unit 400.

The straight pipe spool manufacturing unit 500 may include straight pipe spool welding sites 510 and 520 as illustrated in FIGS. 1 and 9.

As illustrated in FIGS. 1 and 9, the straight pipe spool welding site 510 and 520 may be disposed such that the second handling robot 720, the third handling robot 730 or the gantry crane robot 740 of the handling unit 700 may be accessed smoothly. Accordingly, the spool pipe SP, the connection member CC, or the straight pipe spool 2DS may be effectively moved by the robot.

The spool pipe SP moved from the spool pipe lift 360 or the spool pipe standby unit 370 of the spool pipe bevel processing unit 300 may be disposed in the straight pipe spool welding site 510 and 520 by the second handling robot 720 or the gantry crane robot 740 of the handling unit 700, and the placed spool pipe SP may be pressed and gripped. To this end, the straight pipe spool welding site 510 and 520 may include the spool pipe support units 511 and 521 on which the spool pipe SP is placed and spool pipe gripping units 512 and 522 gripping the spool pipe SP placed on the spool pipe support units 511 and 521 by pressing the spool pipe SP from the upper portion as illustrated in FIGS. 10 and 11. The spool pipe support units 511 and 521 and the spool pipe gripping units 512 and 522 may include a roller RL.

The straight pipe spool manufacturing unit 500 may include a spool pipe auxiliary support unit 580 corresponding to the spool pipe support units 511 and 521 of the straight pipe spool welding site 510 and 520 and including a roller RL as illustrated in FIGS. 1 and 9. The spool pipe auxiliary support unit 580 may be movable, and may be provided on both sides of the straight pipe spool welding sites 510 and 520, respectively.

Accordingly, the spool pipe SP moved from the spool pipe lift 360 or the spool pipe standby unit 370 of the spool pipe bevel processing unit 300 by the second handling robot 720 or the gantry crane robot 740 of the handling unit 700 may be disposed on the spool pipe support units 511 and 521 and the spool pipe auxiliary support unit 580 of the straight pipe spool welding site 510 and 520. When the spool pipe SP is placed on the spool pipe support units 511 and 521 and the spool pipe auxiliary support unit 580 of the straight pipe spool welding site 510 and 520, the spool pipe gripping unit 512 and 522 of the straight pipe spool welding site 510 and 520 may grip the spool pipe SP by pressing one side of the spool pipe SP from the upper portion.

The roller RL included in the spool pipe support units 511 and 521 and the spool pipe gripping units 512 and 522 of the straight pipe spool welding site 510 and 520 may rotate such that the spool pipe SP of the straight pipe spool 2DS gripped by the spool pipe support unit 511 and 521 and the spool pipe gripping units 512 and 522 of the straight pipe spool welding site 510 and 520 may rotate, and the fill and cap welding robot 550 and 560 may perform welding by a flat welding method as illustrated in FIG. 14.

When the spool pipe SP is gripped by the straight pipe spool welding site 510 and 520, the second handling robot 720 of the handling unit 700 may grip the connection member CC such as a fitting member or a flange member, and may move the connection member CC from the second connection member standby unit 440 of the connection member bevel processing unit 400 to the straight pipe spool welding sites 510 and 520. The second handling robot 720 may fit up the bevel surfaces of the spool pipe SP and the connection member CC and may grip the connection member CC during root-welding of the welding bevel WG between the end of the spool pipe SP and the end of the connection member CC.

The straight pipe spool welding site 510 and 520 may include a first straight pipe spool welding site 510 and a second straight pipe spool welding site 520 as illustrated in FIGS. 1 and 9. However, the number of straight pipe spool welding sites 510 and 520 is not limited to any particular example, and any number of the sites may be used.

The straight pipe spool manufacturing unit 500 may further include a first gap sensing robot 570 as illustrated in FIGS. 1 and 9. The first gap sensing robot 570 may be disposed between the first straight pipe spool welding site 510 and the second straight pipe spool welding site 520 of the straight pipe spool manufacturing unit 500. Also, the first gap sensing robot 570 may include a vision sensor VS. The vision sensor VS of the first gap sensing robot 570 may measure a position adjustment condition required for fitting up the bevel surfaces of the end of the spool pipe SP and the end of the connection member CC in each of the first straight pipe spool welding site 510 and the second straight pipe welding site 520 for automatic robot welding.

As illustrated in FIG. 10, the spool pipe SP may be gripped by the first straight pipe spool welding site 510 or the second straight pipe spool welding site 520, and the connection member CC may be may be gripped by the second handling robot 720 of the handling unit 700. Also, the control unit 800 may be linked to the first gap sensing robot 570 and the second handling robot 720 of the handling unit 700, and may allow the circular surface CF of the J-shaped welding bevel WG of the end of the spool pipe SP and the circular surface CF of the J-shaped welding bevel WG at the end of the connection member CC to match as illustrated in FIGS. 11 and 12, such that end of the spool pipe SP and the end of the connection member CC may be fit up. Accordingly, the bevel surfaces of the end of the spool pipe SP and the end of the connection member CC may be automatically fit up. Also, the root-welding of the welding bevel WG between the end of the spool pipe SP and the end of the connection member CC by the root-welding robot 530 and 540 may be formed by no-tack welding.

The control unit 800 may be linked with the first gap sensing robot 570 and the second handling robot 720 of the handling unit 700, and may allow the circular surface CF of the J-shaped welding bevel WG at the end of the connection member CC and the circular surface CF of the J-shaped welding bevel WG at the end of the connection member CC to match and to be in contact with each other, as illustrated in FIGS. 11 and 12. Accordingly, during welding the welding bevel WG between the end of the spool pipe SP and the end of the connection member CC, a back bead may be formed. Accordingly, root-welding of the welding bevel WG between the end of the spool pipe SP and the end of the connection member CC by the root-welding robots 530 and 540 may be performed.

The straight pipe spool manufacturing unit 500 may further include root-welding robots 530 and 540 as illustrated in FIGS. 1 and 9. The root-welding robots 530 and 540 may weld the root portion of the welding bevel WG between the end of the spool pipe SP and the end of the connection member CC, as illustrated in FIG. 13. Accordingly, as illustrated in (c) of FIG. 5, the root welding unit RW may be formed in the welding bevel WG between the end of the spool pipe SP and the end of the connection member CC.

For example, the root-welding robot 530 and 540 may weld the root portion of the welding bevel WG between the end of the spool pipe SP and the end of the connection member CC by gas tungsten arc welding. However, the method of welding the root portion of the welding bevel WG between the end of the spool pipe SP and the end of the connection member CC by the root-welding robots 530 and 540 is not limited to any particular example.

For example, the root-welding robot 530 and 540 may include a welding bevel tracking vision sensor VS, and a digital welding machine (DWM; not illustrated) for gas tungsten arc welding. Also, the root-welding robots 530 and 540 may be moved to perform root-welding in both the first straight pipe spool welding site 510 and the second straight pipe spool welding site 520.

Root-welding robot 530 and 540 may manufacture a straight pipe spool 2DS by welding the root portion of the welding bevel WG between the end of the spool pipe SP and the end of the connection member CC. For example, the root-welding robots 530 and 540 may include a first root-welding robot 530 and a second root-welding robot 540 as illustrated in FIGS. 1 and 9. Also, by the first root-welding robot 530, the right or left semicircular portion of the root portion of the welding bevel WG between the end of the spool pipe SP and the end of the connection member CC may be welded. Also, the left or right semicircular portion of the welding bevel WG between the end of the spool pipe SP and the end of the connection member CC may be welded by the second root welding robot 540. However, a method of welding the root portion of the welding bevel WG between the end of the spool pipe SP and the end of the connection member CC by the root-welding robots 530 and 540 is not limited to any particular example.

When the welding of the root portion of the welding bevel WG between the end of the spool pipe SP and the end of the connection member CC is completed by the second root-welding robot 540, and the straight pipe spool 2DS is manufactured, the second handling robot 720 of the handling unit 700 may release the gripping of the connection member CC and may return to the original position.

In the state in which the spool pipe SP is gripped by the straight pipe spool welding site 510 and 520, and the connection member CC is gripped by the second handling robot 720 of the handling unit 700, since the root portion of the welding bevel WG between the end of the spool pipe SP and the end of the connection member CC may be welded after fitting up the bevel surfaces, tag welding may not be necessary. Accordingly, the root-welding of the spool pipe SP and the connection member CC may be performed more effectively.

The straight pipe spool manufacturing unit 500 may further include fill and cap welding robots 550 and 560 as illustrated in FIGS. 1 and 9. The fill and cap welding robots 550 and 560 may weld the residual portion of the welding bevel WG between the end of the spool pipe SP and the end of the connection member CC as illustrated in FIG. 14. Accordingly, a fill and cap welding portion FW may be formed in the welding bevel WG between the end of the spool pipe SP and the end of the connection member CC, as illustrated in (c) of FIG. 5.

For example, the fill and cap welding robots 550 and 560 may weld the residual portion of the welding bevel WG between the end of the spool pipe SP and the end of the connection member CC by gas metal arc welding. However, the method of welding the remaining portion of the welding bevel WG between the end of the spool pipe SP and the end of the connection member CC by the fill and cap welding robots 550 and 560 is not limited to any particular example.

For example, fill and cap welding robots 550 and 560 may include a welding bevel tracking vision sensor VS, and a digital welding machine for gas metal arc welding.

Also, the fill and cap welding robots 550 and 560 may include a first fill and cap welding robot 550 and a second fill and cap welding robot 560 as illustrated in FIGS. 1 and 9. Also, the first fill and cap welding robot 550 may perform welding at the first straight pipe spool welding site 510, and the second fill and cap welding robot 560 may perform welding at the second straight pipe spool welding site 520. Accordingly, the two straight pipe spools 2DS may be simultaneously manufactured at the first and second straight pipe spool welding sites 510 and 520.

As described above, the roller RL included in the spool pipe support units 511 and 521 and the spool pipe gripping units 512 and 522 of the straight pipe spool welding site 510 and 520 may rotate therein, such that the spool pipe SP of the straight pipe spool 2DS gripped by the spool pipe gripping units 512 and 522 and the spool pipe support units 511 and 521 of the straight pipe spool welding sites 510 and 520 may rotate, and the fill and cap welding robots 550 and 560 may perform welding by a flat welding method as illustrated in FIG. 14.

When the welding of the remaining portion of the welding bevel WG between the end of the spool pipe SP and the end of the connection member CC is completed by the fill and cap welding robot 550 and 560, the straight pipe spool 2DS which becomes the three-dimensional spool 3DS may be moved from the straight pipe spool welding site 510 and 520 to the three-dimensional spool welding site 610 of the three-dimensional spool manufacturing unit 600 by the third handling robot 730 or the gantry crane robot 740 of the handling unit 700.

Also, the straight pipe spool 2DS, which may not become the three-dimensional spool 3DS may be moved to the spool unloading unit 750 of the ling unit 700 by the gantry crane robot 740 of the handling unit 700 as illustrated in (a) of FIG. 25 and may be discharged to the pipe spool PS.

This series of processes in the straight pipe spool manufacturing unit 500 may be controlled by the control unit 800 connected to each of the above-described components included in the straight pipe spool manufacturing unit 500.

The three-dimensional spool manufacturing unit 600 may include a three-dimensional spool welding site 610 as illustrated in FIGS. 1 and 15.

The three-dimensional spool welding site 610 may be disposed such that the third handling robot 730 or the gantry crane robot 740 of the handling unit 700 may smoothly access thereto, as illustrated in FIGS. 1 and 15. Accordingly, the straight pipe spool 2DS, the connection member CC, or the three-dimensional spool 3DS may be effectively moved by the robot.

The three-dimensional spool 3DS manufactured by the three-dimensional spool manufacturing unit 600 may be larger than the straight pipe spool 2DS. Accordingly, the three-dimensional spool welding site 610 may be provided on a level higher than a level of the straight pipe spool welding sites 510 and 520 of the straight pipe spool manufacturing unit 500 such that the space for manufacturing the three-dimensional spool 3DS may be secured, and the three-dimensional spool 3DS may be effectively manufactured and moved.

The straight pipe spool 2DS moved from the straight pipe spool manufacturing unit 500 by the third handling robot 730 or the gantry crane robot 740 of the handling unit 700 may be disposed in the three-dimensional spool welding site 610, and the straight pipe spool 2DS may be pressed and gripped. To this end, the three-dimensional spool welding site 610 may include a straight pipe spool support unit 611 on which a straight pipe spool 2DS is placed, and a straight pipe spool gripping unit 612 for gripping one side of the straight pipe spool 2DS placed on the straight pipe spool support unit 611 by pressing one side from the upper portion, as illustrated in FIGS. 17 to 19. The straight pipe spool support unit 611 and the straight pipe spool gripping unit 612 may include a roller RL.

The three-dimensional spool manufacturing unit 600 may include a straight pipe spool auxiliary support unit 670 corresponding to the straight pipe spool support unit 611 of the three-dimensional spool welding site 610 and including a roller RL as illustrated in FIGS. 1 and 15. The straight pipe spool auxiliary support unit 670 may be movable.

Accordingly, the straight pipe spool moved from the straight pipe spool welding site 510 and 520 of the straight pipe spool manufacturing unit 500 2DS by the third handling robot 730 or the gantry crane robot 740 of the handling unit 700 may be placed on the straight pipe spool support unit 611 and the straight pipe spool auxiliary support unit 670 of the three-dimensional spool welding site 610. When the straight pipe spool 2DS is placed on the straight pipe spool support unit 611 and the straight pipe spool auxiliary support unit 670 of the three-dimensional spool welding site 610, the straight pipe spool gripping unit 612 of the three-dimensional spool welding site 610 may grip the straight pipe spool 2DS by pressing one side of the straight pipe spool 2DS from the upper portion.

The roller RL included in the straight pipe spool support unit 611 and the straight pipe spool gripping unit 612 of the three-dimensional spool welding site 610 may rotate therein, such that the adjustment of the angle of the straight pipe spool 2DS according to the measurement result of the angle sensing robot 690 and the adjustment of the angle of the three-dimensional spool 3DS to be moved by the gantry crane robot 740 of the handling unit 700 may be performed.

When the straight pipe spool 2DS is gripped by the three-dimensional spool welding site 610, the third handling robot 730 of the handling unit 700 may grip another straight pipe spool 2DS on standby in the straight pipe spool manufacturing unit 500 or the connection member CC on standby in the second connection member standby unit 440 of the connection member bevel processing unit 400 and may move the component to the three-dimensional spool welding site 610. The third handling robot 730 may grip the other straight pipe spools 2DS or the connection members CC during the fitting up the bevel surfaces of the straight pipe spool 2DS and the other straight pipe spool 2DS or the connection member CC and root-welding of the welding bevel WG between the end of the other straight pipe spool 2DS or the end of the connection members CC.

The three-dimensional spool manufacturing unit 600 may further include an angle sensing robot 690 as illustrated in FIGS. 1 and 15. As illustrated in FIG. 16, the angle sensing robot 690 may include a vision sensor VS. The vision sensor VS of the angle sensing robot 690 may measure the angle between the end of the side of the straight pipe spool 2DS gripped by in the three-dimensional spool welding site 610, which is not currently welded, and the end of the side of the other straight pipe spool 2DS or the connection member CC gripped by the third handling robot 730 of the handling unit 700, which is not currently welded. Also, to match the angle between one end and the other end of the three-dimensional spool 3DS to be manufactured, the straight pipe spool 2DS gripped by the three-dimensional spool welding site 610 may rotate by rotating the roller RL of the straight pipe spool support unit 611 and the straight pipe spool gripping unit 612 of the three-dimensional spool welding site 610.

The three-dimensional spool manufacturing unit 600 may further include a second gap sensing robot 660 as illustrated in FIGS. 1 and 15. The second gap sensing robot 660 may be disposed in front of the three-dimensional spool welding site 610. Also, the second gap sensing robot 660 may include a vision sensor VS as illustrated in FIGS. 18 and 19. The vision sensor VS of the second gap sensing robot 660 may measure the position adjustment condition required for fitting up the bevel surfaces of the end of the straight pipe spool 2DS in the three-dimensional spool welding site 610 for automatic robot welding and the end of the other straight pipe spool 2DS or the end of the connection member CC.

As illustrated in FIG. 17, the straight pipe spool 2DS may be gripped by the three-dimensional spool welding site 610, and the other straight pipe spool 2DS or the connection member CC may be gripped by the third handling robot 730 of the handling unit 700. Also, the control unit 800 may be linked with the second gap sensing robot 660 and the third handling robot 730 of the handling unit 700, and may allow the circular surface CF of the J-shaped welding bevel WG of the end of the straight pipe spool 2DS and the circular surface CF of the J-shaped welding bevel WG of the end of the other straight pipe spool 2DS or the end of the connection member CC to match, such that the bevel surfaces of the end of the straight pipe spool 2DS and the end of the other straight pipe spool 2DS or the end of the connection member CC may be fit up, as illustrated in FIGS. 18 and 19. Accordingly, the bevel surfaces of the end of the straight pipe spool 2DS and the end of the other straight pipe spool 2DS or the end of the connection member CC may be fit up automatically. Also, the root-welding of the welding bevel WG between the end of the straight pipe spool 2DS by the root-welding robots 620 and 630 and the end of the other straight pipe spool 2DS or the end of the connection member CC may be performed as no-tack welding.

The control unit 800 may be linked with the second gap sensing robot 660 and the third handling robot 730 of the handling unit 700, and may allow the circular surface CF of the J-shaped welding bevel WG at the end of the straight pipe spool 2DS and the circular surface CF of the J-shaped welding bevel WG of the end of the other straight pipe spool 2DS or the end of the connection member CC to match and to be in contact with each other as illustrated in FIGS. 18 and 19. Accordingly, during welding the welding bevel WG between the end of the straight pipe spool 2DS and the end of the other straight pipe spool 2DS or the connection member CC, a back bead may be formed. Accordingly, root-welding by the root-welding robots 530 and 540 of the welding bevel WG between the end of the straight pipe spool 2DS and the end of the other straight pipe spool 2DS or the end of the connection member CC may be performed.

The three-dimensional spool manufacturing unit 600 may further include root-welding robots 620 and 630. The root-welding robots 620 and 630 may weld a root portion between the welding bevel WG between the end of the straight pipe spool 2DS and the end of the other straight pipe spool 2DS or the end of the connection member CC as illustrated in FIG. 20. Accordingly, the root-welding unit RW may be formed in the welding bevel WG between the end of the straight pipe spool 2DS and the end of the other straight pipe spool 2DS or the end of the connection member CC as illustrated in (c) of FIG. 5.

For example, the root-welding robot 620 and 630 may weld the root portion of the welding bevel WG between the end of the straight pipe spool 2DS and the end of the other straight pipe spool 2DS or the end of the connection member CC by gas tungsten arc welding. However, the method of welding the root portion of the welding bevel WG between the end of the straight pipe spool 2DS and the end of the other straight pipe spool 2DS or the end of the connection member CC by the root-welding robots 620 and 630 is not limited to any particular example.

For example, the root-welding robot 620 and 630 may include a welding bevel tracking vision sensor VS, and a digital welding machine for gas tungsten arc welding.

The root-welding robot 620 and 630 may manufacture a three-dimensional spool 3DS by welding the root portion of the welding bevel WG between the end of the straight pipe spool 2DS and the end of the other straight pipe spool 2DS or the end of the connection member CC. For example, the root-welding robots 620 and 630 may include a third root welding robot 620 and a fourth root welding robot 630 as illustrated in FIGS. 1 and 15. Also, the right or left side semicircular portion of the root portion of the welding bevel WG between the end of the straight pipe spool 2DS and the end of the other straight pipe spool 2DS or the end of the connection member CC may be welded by the third root welding robot 620. Also, the left or right semicircular portion of the root portion of the welding bevel WG between the end of the straight pipe spool 2DS and the end of the other straight pipe spool 2DS or the end of the connection member CC by the fourth root welding robot 630. However, a method of welding the root portion of the welding bevel WG between the end of the straight pipe spool 2DS and the end of the other straight pipe spool 2DS or the end of the connection member CC by the root-welding robots 620 and 630 is not limited to any particular example.

When the welding of the welding bevel WG between the end of the straight pipe spool 2DS and the end of the other straight pipe spool 2DS or the end of the connection member CC may be completed by the fourth root welding robot 630 and the three-dimensional spool 3DS is manufactured, the third handling robot 730 of the handling unit 700 may release the gripping of the other straight pipe spool 2DS or the connection member CC and may return to the original position.

In a state in which the straight pipe spool 2DS is gripped by the three-dimensional spool welding site 610, and the other straight pipe spool 2DS or the connection member CC is gripped by the third handling robot 730 of the handling unit 700, since the root portion of the welding bevel WG between the end of the straight pipe spool 2DS and the end of the other straight pipe spool 2DS or the end of the connection member CC may be welded after the bevel surfaces are fitted, tack-welding may not be necessary. Accordingly, root-welding of the straight pipe spool 2DS and the other straight pipe spool 2DS or the connection member CC may be performed more effectively.

The three-dimensional spool manufacturing unit 600 may further include fill and cap welding robots 640 and 650 and a grinding robot 680 as illustrated in FIGS. 1 and 15.

The fill and cap welding robots 640 and 650 may weld the residual portion of the welding bevel WG between the end of the straight pipe spool 2DS and the end of the other straight pipe spool 2DS or the end of the connection member CC as illustrated in FIG. 21. Accordingly, the fill and cap welding unit FW may be formed between the end of the straight pipe spool 2DS and the end of the other straight pipe spool 2DS or the end of the connection member CC as illustrated in (c) of FIG. 5.

For example, the fill and cap welding robots 640 and 650 may weld the residual portion of the welding bevel WG between the end of the straight pipe spool 2DS and the end of the other straight pipe spool 2DS or the end of the connection member CC by gas metal arc welding. However, a method of welding the residual portion of the welding bevel WG between the end of the straight pipe spool 2DS and the end of the other straight pipe spool 2DS or the end of the connection member CC by the fill and cap welding robots 640 and 650 is not limited to any particular example.

For example, the fill and cap welding robots 640 and 650 may include a welding bevel tracking vision sensor VS and a digital welding machine for gas metal arc welding.

Also, the fill and cap welding robots 640 and 650 may include a third fill and cap welding robot 640 and a fourth fill and cap welding robot 650 as illustrated in FIGS. 1 and 15. Also, the right or left semicircle portion of the residual portion of the end of the straight pipe spool 2DS and the end of the other straight pipe spool 2DS or the end of the connection member CC may be welded by the third fill and cap welding robot 640. Also, the right or left semicircle portion of the residual portion of the end of the straight pipe spool 2DS and the end of the other straight pipe spool 2DS or the end of the connection member CC may be welded by the fourth fill and cap welding robot 650. However, a method of welding the residual portion of the end of the straight pipe spool 2DS and the end of the other straight pipe spool 2DS or the end of the connection member CC by the fill and cap welding robots 640 and 650 is not limited to any particular example.

When the residual portion of the end of the straight pipe spool 2DS and the end of the other straight pipe spool 2DS or the end of the connection member CC is welded by the third fill and cap welding robot 640, the welding may be performed from the lower portion to the upper portion. Accordingly, the molten metal may flow to the welding start portion such that the welding start portion may be thicker than the other portion. To prevent this, after the residual portion of the end of the straight pipe spool 2DS and the end of the other straight pipe spool 2DS or the end of the connection member CC is welded by the third fill and cap welding robot 640, the welding start portion may be ground by the grinding robot 680. Accordingly, welding quality may improve. In this case, the grinding robot 680 may include a vision sensor VS, such that the position of the welding start to be ground may be identified. However, the method of grinding the welding start portion by the grinding robot 680 is not limited to any particular example. Also, the configuration in which the grinding robot 680 grinds the welding start portion is not limited to any particular example, and any well-known configuration in which the welding start portion is ground may be used.

The welding of the residual portion of the welding bevel WG between the end of the straight pipe spool 2DS and the end of the other straight pipe spool 2DS or the end of the connection member CC by the fill and cap welding robots 640 and 650 is completed, the three-dimensional spool 3DS may rotate such that the three-dimensional spool 3DS may move stably by rotating the roller RL of the straight pipe spool support unit 611 and the straight pipe spool gripping unit 612 of the three-dimensional spool welding site 610. Thereafter, the three-dimensional spool 3DS may be moved to the spool unloading unit 750 by the gantry crane robot 740 of the handling unit 700, and may be discharged to the pipe spool PS as illustrated in (b) of FIG. 25.

The series of processes in the three-dimensional spool manufacturing unit 600 may be controlled by the control unit 800 connected to each of the above-described components included in the three-dimensional spool manufacturing unit 600.

In the three-dimensional spool manufacturing unit 600, the manufacturing of the straight pipe spool 2DS and the three-dimensional spool 3DS by welding the other straight pipe spool 2DS or the connection member CC, and also the manufacturing of the three-dimensional spool 3DS by welding the straight pipe spool 2DS and the spool pipe SP and the manufacturing of the straight pipe spool 2DS by welding the spool pipe SP and the connection member CC may be performed.

When the three-dimensional spool 3DS is manufactured by welding the straight pipe spool 2DS and the spool pipe SP in the three-dimensional spool manufacturing unit 600, the straight pipe spool 2DS may be gripped by the three-dimensional spool welding site 610 and the spool pipe SP may be gripped by the third handling robot 730 of the handling unit 700. Also, when manufacturing the straight pipe spool 2DS by welding the spool pipe SP and the connection member CC in the three-dimensional spool manufacturing unit 600, the spool pipe SP may be gripped to the three-dimensional spool welding site 610 and the connection member CC may be gripped by the third handling robot 730 of the handling unit 700.

As illustrated in FIGS. 1 and 22, the handling unit 700 may include handling robots 710, 720, and 730, a gantry crane robot 740, and a spool unloading unit 750.

The handling robots 710, 720, and 730 and the gantry crane robot 740 may move a spool pipe SP, a connection member CC, a straight pipe spool 2DS or a three-dimensional spool 3DS as illustrated in FIGS. 23 and 24. Also, the handling robots 710, 720, and 730 may grip the connection member CC or the straight pipe spool 2DS during welding, and may adjust the position of the connection member CC or the straight pipe spool 2DS or may support the connection member CC or the straight pipe spool 2DS as illustrated in FIGS. 10 to 13 or 17 to 20.

The handling robots 710, 720 and 730 may include a first handling robot 710, a second handling robot 720, and a third handling robot 730 as illustrated in FIGS. 1 and 22.

The first handling robot 710 may move the fitting member included in the connection member CC from the first connection member standby unit 430 of the connection member bevel processing unit 400 to the first connection member bevel processing device 410, or may move the flange member included in the connection member CC from the first connection member standby unit 430 to the second connection member bevel processing device 420.

In this case, the first handling robot 710 may support the connection member CC such that, when the connection member CC such as a fitting member or a flange member moves, the information on the pipe spool PS to be formed by the connection member CC may be recorded in the connection member CC by the second information marking device 450 of the connection member bevel processing unit 400.

Also, the first handling robot 710 may move the connection member CC of which the welding bevel WG may not be formed in the end thereof by the connection member bevel processing device 410 and 420 of the connection member bevel processing unit 400 or the inner and outer diameters may not be processed, or the connection member CC which may be determined to be discharged by the MES of the control unit 800 to the first connection member standby unit 430 of the connection member bevel processing unit 400.

Also, the first handling robot 710 may grip and support a portion of the connection members CC when the welding bevel WG and the inner and outer diameter of the end of the connection member CC is processed by the connection member bevel processing device 410 and 420.

The second handling robot 720 may move the spool pipe SP of which the end is processed and which stands by in the spool pipe lift 360 or the spool pipe standby unit 370 of the spool pipe bevel processing unit 300 to the straight pipe spool welding sites 510 and 520 of the manufacturing unit 500.

Also, the second handling robot 720 may move the connection member CC of which the end is processed and which stands by in the second connection member standby unit 440 of the connection member bevel processing unit 400 to the straight pipe spool welding sites 510 and 520 of the straight pipe spool manufacturing unit 500.

The second handling robot 720 may be linked with the gap sensing robot 570 of the straight pipe spool manufacturing unit 500 by the control unit 800 while gripping the connection member CC as illustrated in FIGS. 10 to 12, and may allow the bevel surfaces of the end of the spool pipe SP gripped by the straight pipe spool welding site 510 and 520 and the end of the connection member CC to be fitted.

Also, the second handling robot 720 may grip the connection member CC when the root portion of the welding bevel WG between the end of the spool pipe SP and the end of the connection member CC is welded by the root-welding robot 530 and 540 of the straight pipe spool manufacturing unit 500, as illustrated in FIG. 13.

The third handling robot 730 may move the straight pipe spool 2DS on standby in the straight pipe spool welding site 510 and 520 of the straight pipe spool manufacturing unit 500 to the three-dimensional spool welding site 610 of the three-dimensional spool manufacturing unit 600.

Also, the third handling robot 730 may move the connection member CC such as a fitting member and a flange member, of which the end is processed and which stands by in the second connection member standby unit 440 of the connection member bevel processing unit 400, to the three-dimensional spool welding site 610 of the three-dimensional spool manufacturing unit 600.

The third handling robot 730 may be linked with the second gap sensing robot 660 of the manufacturing unit 600 by the control unit 800 while gripping the other straight pipe spool 2DS or the connection member CC, and may allow the bevel surfaces of the end of the straight pipe spool 2DS gripped by the three-dimensional spool welding site 610 of the three-dimensional spool manufacturing unit 600 and the end of the other straight pipe spool 2DS or the end of the connection member CC to be fitted up, as illustrated in FIGS. 17 to 19.

Also, the third handling robot 730 may grip the other straight pipe spool 2DS or the connection member CC when the root portion of the welding bevel WG between the end of the straight pipe spool 2DS and the end of the other straight pipe spool 2DS or the end of the connection member CC by the root-welding robots 620 and 630 of the three-dimensional spool manufacturing unit 600 as illustrated in FIG. 20. In the case in which the three-dimensional spool 3DS is manufactured by welding the straight pipe spool 2DS and the spool pipe SP in the three-dimensional spool manufacturing unit 600, the third handling robot 730 may grip the spool pipe SP.

The first, second, and third handling robots 710, 720, and 730 may be, for example, 6-axis robots. Also, the first, second, and third handling robots 710, 720, and 730 may include a multi-use gripper for gripping heavy objects of various shapes such as the spool pipe SP, the connection member CC, or the straight pipe spool 2DS. However, the first, second, and third handling robots 710, 720, and 730 are not limited to any particular example, and any well-known handling robot which may move the spool pipe SP, the connection member CC, or the straight pipe spool 2DS, may adjust the position of the connection member CC or the straight pipe spool 2DS by gripping the connection member CC or the straight pipe spool 2DS or may support these components may be used.

The gantry crane robot 740 may move the spool pipe SP, the connection member CC, the straight pipe spool 2DS or the three-dimensional spool 3DS.

The gantry crane robot 740 may move the spool pipe SP from the spool pipe lift 360 or the spool pipe standby unit 370 of the spool pipe bevel processing unit 300 to the straight pipe spool welding site 510 and 520 or the spool unloading unit 750 of the straight pipe spool manufacturing unit 500. In the case in which the manufacturing of the three-dimensional spool 3DS by welding the straight pipe spool 2DS and the spool pipe SP or the manufacturing of the straight pipe spool 2DS by welding the spool pipe SP and the connection member CC is performed in the three-dimensional spool manufacturing unit 600, the gantry crane robot 740 may move the spool pipe SP from the spool pipe lift 360 or the spool pipe standby unit 370 of the spool pipe bevel processing unit 300 to the three-dimensional spool welding site 610 of the three-dimensional spool manufacturing unit 600.

Also, the gantry crane robot 740 may move the straight pipe spool 2DS manufactured at the straight pipe spool welding sites 510 and 520 of the straight pipe spool manufacturing unit 500 to the three-dimensional spool welding site 610 of the three-dimensional spool manufacturing unit 600. Also, the gantry crane robot 740 may move the three-dimensional spool 3DS manufactured at the three-dimensional spool welding site 610 of the three-dimensional spool manufacturing unit 600 from the three-dimensional spool welding site 610 to the spool unloading unit 750.

Also, the gantry crane robot 740 may move the spool pipe SP or straight pipe spool 2DS of various shapes, which may be discharged before being manufactured on the system 100 for automatically manufacturing a pipe spool 100, to the spool unloading unit 750.

The spool pipe SP, the straight pipe spool 2DS or the three-dimensional spool 3DS may be disposed on the spool unloading unit 750. The spool unloading unit 750 may include an object sensor and may sense that the spool pipe SP, the straight pipe spool 2DS, or the three-dimensional spool 3DS is disposed.

This series of processes in the handling unit 700 may be controlled by the control unit 800 connected to each of the above-described components included in the handling unit 700.

When the control unit 800 receives information on the pipe spool PS, the control unit 800 may allow the pipe spool PS to be manufactured according to the input information without intervention from an operator or a surge by controlling each of the pipe cutting unit 200, the spool pipe bevel processing unit 300, the connection member bevel processing unit 400, the straight pipe spool manufacturing unit 500, the three-dimensional spool manufacturing unit 600 and the handling unit 700.

The control unit 800 may receive data for the pipe spool PS designed through a program (not illustrated) by a designer (not illustrated). In this case, data on the pipe spool PS designed by the designer through a program may be wirelessly transmitted to the control unit 800, and the control unit 800 may receive information on the pipe spool PS. However, the method and configuration in which the control unit 800 receives information on the pipe spool PS is not limited to any particular example, and any well-known method and configuration may be used.

The control unit 800 may perform operations and control operations necessary for operation of the system 100 for automatically manufacturing a pipe spool 100 centering on the MES.

In this case, the MES of the control unit 800 may be processed as, for example, piping component file (PCF) data for the pipe spool PS rather than the drawing of the pipe spool PS unit. Accordingly, the information on the pipe spool PS which the controller 800 receives may be PCF data of the pipe spool PC. The PCF data of the pipe spool PS may include the position information of the welding joint (the portion in which welding is performed), and also the member information and other information necessary for automatic robot welding. Using the PCF data, the pipe spool PS may be manufactured without drawings.

In this case, when the PCF data of the pipe spool PS is received by the MES of the control unit 800, the MES may examine whether the members included in the pipe spool PS may be combined, which may be welded by automatic robot welding, may also calculate whether the dimensions are transportable by a 40 ft container for the transportation of the pipe spool PS, for example, and may select the pipe spool PS to be automatically manufactured.

In particular, the examining whether the members included in the pipe spool PS may be combined, which may be welded by automatic robot welding by the MES of the control unit 800 may be performed based on 3D modeling using the PCF data of the pipe spool PS. For example, 3D modeling of each member to be included in the pipe spool PS may be formed from the PCF data of the pipe spool PS in the MES of the control unit 800, the members may be combined based on 3D modeling of each member, and may examine whether the combination of the members may be welded by automatic robot welding. That is, the MES of the control unit 800 may simulate whether the components included in the straight pipe spool manufacturing unit 500, the three-dimensional spool manufacturing unit 600 and the handling unit 700 may perform the process for manufacturing the pipe spool PS in sequence by combining the 3D modeling of each member included in the pipe spool PS, created from the PCF data of the pipe spool PS, and whether the members included in the pipe spool PS may be combined may be examined. Also, the MES of the control unit 800 may calculate and reflect the center of gravity when the spool pipe SP, the straight pipe spool 2DS or three-dimensional spool 3DS are transferred using the second handling robot 720, the third handling robot 730, or the gantry crane robot 740 of the handling unit 700.

When the pipe spools PS to be automatically manufactured through the MES of the control unit 800 are selected, a fabrication plan may be established in the MES to manufacture many pipe spools PS as possible. In this case, the use of the residual pipe managed on the manufacturing execution unit may be reflected in the fabrication plan. Also, the processes in the pipe cutting unit 200, the spool pipe bevel processing unit 300, the connection member bevel processing unit 400, the straight pipe spool manufacturing unit 500, the three-dimensional spool manufacturing unit 600, and the handling unit 700, through which each member required for the manufacturing the pipe spool PS may pass, may be determined by the MES and may be reflected in the fabrication plan.

For example, an end to which the J-shaped welding bevel WG is applied among both ends of the spool pipe SP may be determined. Also, the series of procedures such as welding site to be used among the first straight pipe spool welding site 510 and the second straight pipe spool welding site 520 of the straight pipe spool manufacturing unit 500, a robot to be used for transport, and whether to use the three-dimensional spool welding site of the three-dimensional spool manufacturing unit 600 may be determined by the MES and may be reflected in the fabrication plan.

The fabrication achievement may be managed through the MES. For example, the fitting up of the bevel surface, processed by the straight pipe spool manufacturing unit 500 and the three-dimensional spool manufacturing unit 600, may be recorded in the MES as fabrication achievement. Also, the ID and date and time of the robot applied to each welding joint may be recorded in the MES as the fabrication achievement with respect to automatic robot welding, and the hit number to be verified for the related members may also be input to the MES as the fabrication achievement.

The control unit 800 may further include an integrated operating program (not illustrated), an integrated programmable logic controller (PLC; not illustrated), a local PLC (not illustrated), and a local operating program (not illustrated), which may be connected around the MES.

By the configuration of this control unit 800, for example, the original pipe RP may be moved to the pipe cutting unit 200 and may be cut with the pipe cutter 210 of the pipe cutting unit 200 such that the spool pipe SP of a predetermined desired length may be manufactured.

Also, the spool pipe SP may be moved to the spool pipe bevel processing unit 300, the J-shaped welding bevel WG or the V-shaped welding bevel WG is formed in the end of the spool pipe SP by the spool pipe bevel processing devices 310 and 320 of the spool pipe bevel processing unit 300, and the inner and outer diameters of the end of the spool pipe SP in which the welding bevel WG is formed may be processed. Also, the connection member CC may be moved to the connection member bevel processing unit 400 and the J-shaped welding bevel WG may be formed in the end of the connection member CC by the connection member bevel processing devices 410 and 420, and the inner and outer diameters of the end of the connection member CC in which the welding bevel WG is formed may be processed.

The spool pipe SP and the connection member CC may be moved to the straight pipe spool welding site 510 and 520 by the handling unit 700, the spool pipe SP and the connection member CC may be welded by the welding robot 530, 540, 550, and 560 of the straight pipe spool manufacturing unit 500 such that the straight pipe spool 2DS may be manufactured.

Also, the straight pipe spool 2DS and the other straight pipe spool 2DS or the connection member CC may be moved to the three-dimensional spool manufacturing unit 600 by the handling unit 700, the straight pipe spool 2DS and the other straight pipe spool 2DS or the connection member CC are welded by the welding robots 620, 630, 640 and 650 of the three-dimensional spool manufacturing unit 600, such that the three-dimensional spool 3DS may be manufactured.

The devices included in each component may be controlled by the integrated operating program, integrated PLC, local PLC and, local operating programs included in the control unit 800 as described above. Also, the operation performance and work performance of each device may be checked, such that the system 100 for automatically manufacturing a pipe spool 100 may be managed to operate optimally.

As described above, using the system for automatically manufacturing a pipe spool according to an example embodiment, when information on the pipe spool is input to the control unit, the control unit may allow the series of processes for manufacturing the pipe spool to be performed consecutively without intervention from an operator or a surge, such that the pipe spool may be automatically manufactured according to the input information.

While the example embodiments have been illustrated and described above, it will be apparent to those skilled in the art that modifications and variations could be manufactured without departing from the scope of the present disclosure as defined by the appended claims.

The invention claimed is:

1. A system for automatically manufacturing a pipe spool, the system comprising:
  a pipe cutting unit including a pipe cutter for cutting an original pipe to have a predetermined desired length to manufacture a spool pipe;
  a spool pipe beveling unit including a spool pipe beveler for forming a welding bevel in an end of the spool pipe;
  a connection member beveling unit including a connection member beveler for forming a welding bevel in an end of a connection member;
  a straight pipe spool manufacturing unit including a straight pipe spool welding site and a first welding robot, wherein the first welding robot is configured to manufacture a straight pipe spool by welding the connection member to the spool pipe;
  a three-dimensional spool manufacturing unit including a three-dimensional spool welding site and a second welding robot, wherein the second welding robot is configured to manufacture a three-dimensional spool by welding the straight pipe spool to another straight pipe spool or the connection member;
  a handling unit including a handling robot and a gantry crane robot, wherein the gantry crane robot is configured to move the spool pipe, the connection member, the straight pipe spool, or the three-dimensional spool, and wherein the handling robot is configured to grip the connection member or the straight pipe spool during welding; and
  a control unit configured to receive information on a designed pipe spool, and connected to each of the pipe cutting unit, the spool pipe beveling unit, the connection member beveling unit, the straight pipe spool manufacturing unit, the three-dimensional spool manufacturing unit, and the handling unit and configured to control them according to the information on the designed pipe spool.

2. The system of claim 1, wherein the pipe cutting unit further includes a first information marker, and the first information marker is configured to record the information on the designed pipe spool input to the control unit in the spool pipe.

3. The system of claim 2, wherein when a residual pipe, which is a portion of the original pipe remaining after manufacturing the spool pipe, is longer than a length of another spool pipe to be manufactured, the control unit is configured to cut the residual pipe with the pipe cutter and to manufacture the residual pipe as another spool pipe, and when the residual pipe is shorter than a length of another spool pipe to be manufactured, the control unit is configured to discharge the residual pipe from the pipe cutting unit and to manage the residual pipe separately.

4. The system of claim 1, wherein the spool pipe beveler includes a vision sensor configured to measure a shape, circularity, a thickness, and a center of an end of the spool pipe and transmit the measurements to the control unit, and
the control unit is configured to determine whether to bevel the end of the spool pipe according to the measurement result of the vision sensor, and when it is determined that it is possible to bevel the end, the control unit is configured to perform beveling of the end of the spool pipe, and when it is not possible to bevel the end, the control unit is configured to discharge the spool pipe from the spool pipe beveling unit.

5. The system of claim 1, wherein the spool pipe beveler is configured to form a J-shaped welding bevel for automatic robot welding or a V-shape welding bevel for manual welding to be formed in the end of the spool pipe by the spool pipe beveler, and is configured to perform machining of inner and outer diameters of the end of the spool pipe in which the welding bevel is formed.

6. The system of claim 1, wherein the connection member beveling unit further includes a second information marker,
the connection member beveler includes a vision sensor configured to measure a shape, circularity, a thickness, and a center of the end of the connection member and transmit the measurements to the control unit, and
the control unit is configured to determine whether to bevel the end of the connection member according to the measurement result of the vision sensor, and when it is determined that it is possible to bevel the end, the second information marker is configured to record the information on the designed pipe spool, input to the control unit, in the connection member, and the control unit is configured to control beveling of the end of the connection member, and when it is determined that it is not possible to bevel the end, the control unit is configured to discharge the connection member from the connection member beveling unit.

7. The system of claim 1, wherein the connection member beveler is configured to form a J-shaped welding bevel for automatic robot welding to be formed in the end of the connection member, and is configured to perform machining of inner and outer diameters of the end of the connection member in which the welding bevel is formed.

8. The system of claim 1, wherein, to fit up bevel surfaces and to perform no-tack welding by a robot in the straight pipe spool manufacturing unit or the three-dimensional spool manufacturing unit, the spool pipe beveling unit is configured to allow a J-shaped welding bevel to be formed at an end of the spool pipe by the spool pipe beveler, and the connection member beveling unit is configured to allow a J-shaped welding bevel to be formed at an end of the connection member by the connection member beveler.

9. The system of claim 8, wherein the spool pipe beveler is configured to perform machining of inner and outer diameters of an end of the spool pipe in which the welding bevel is formed, and
the connection member beveler is configured to perform machining of inner and outer diameters of an end of the connection member in which the welding bevel is formed.

10. The system of claim 8, wherein, in the straight pipe spool manufacturing unit, the bevel surfaces are fit up as the spool pipe is gripped by the straight pipe spool welding site and the connection member is gripped by the handling robot, the first welding robot includes a first root-welding robot and a first fill and cap welding robot, the first root-welding robot is configured to weld a root portion between the spool pipe and the connection member, and the first fill and cap welding robot is configured to weld another portion between the spool pipe and the connection member.

11. The system of claim 8, wherein, in the three-dimensional spool manufacturing unit, the bevel surfaces are fit up as the straight pipe spool is gripped by the three-dimensional spool welding site and the another straight pipe spool or the connection member is gripped by the handling robot, the second welding robot includes a second root-welding robot and a second fill and cap welding robot, the second root-welding robot is configured to weld a root portion between the straight pipe spool and the another straight pipe spool or the connection member, and the second fill and cap welding robot is configured to weld another portion between the straight pipe spool and the another straight pipe spool or the connection member.

12. The system of claim 1, wherein the information on the pipe spool is piping component file (PCF) data of the pipe spool.

* * * * *